United States Patent
Shimizu et al.

(10) Patent No.: US 6,595,074 B2
(45) Date of Patent: Jul. 22, 2003

(54) TORQUE DETECTING DEVICE AND ELECTROMOTIVE POWER STEERING APPARATUS MOUNTING THE TORQUE DETECTING DEVICE THEREON

(75) Inventors: Yasuo Shimizu, Saitama (JP); Shunichiro Sueyoshi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/060,090

(22) Filed: Jan. 29, 2002

(65) Prior Publication Data
US 2002/0117348 A1 Aug. 29, 2002

(30) Foreign Application Priority Data
Feb. 28, 2001 (JP) .......................................... 2001-055969

(51) Int. Cl.[7] ................................................. G01L 3/02
(52) U.S. Cl. ........................... 73/862.333; 73/862.338; 180/443
(58) Field of Search ................................ 180/421–423, 180/443, 444, 446; 73/862.333–862.336, 862.338, 847

(56) References Cited

U.S. PATENT DOCUMENTS

| | | | | |
|---|---|---|---|---|
| 4,896,544 A | * | 1/1990 | Garshelis | 73/862.333 |
| 4,964,308 A | * | 10/1990 | Edo et al. | 73/862.333 |
| 5,321,985 A | * | 6/1994 | Kashiwagi et al. | 73/862.335 |
| 5,449,418 A | * | 9/1995 | Takagi et al. | 148/304 |
| 5,578,767 A | * | 11/1996 | Chikaraishi et al. | 73/862.331 |
| 5,589,645 A | * | 12/1996 | Kobayashi et al. | 73/862.335 |
| 6,328,128 B1 | * | 12/2001 | Chikaraishi | 180/446 |
| 6,360,841 B1 | * | 3/2002 | Blandino et al. | 180/443 |
| 6,389,910 B1 | * | 5/2002 | Eisenhauer | 73/862.193 |
| 6,422,095 B1 | * | 7/2002 | Shimizu et al. | 73/862.335 |
| 6,450,044 B1 | * | 9/2002 | Eisenhauer et al. | 73/862.193 |

FOREIGN PATENT DOCUMENTS

JP  07-333082  12/1995

* cited by examiner

Primary Examiner—Lesley D. Morris
Assistant Examiner—L. Lum
(74) Attorney, Agent, or Firm—Carrier, Blackman & Associates, P.C.; Joseph P. Carrier; William D. Blackman

(57) ABSTRACT

A torque detecting device includes a pair of fixed portions are provided on a rotating shaft to have a predetermined distance in an axially longitudinal direction, a permanent strain portion which changes a magnetostrictive characteristic corresponding to an applied torque is provided between the fixed portions, and a multilayered solenoid winding coil for electrically detecting a magnetostrictive effect produced in the permanent strain portion is provided around the permanent strain portion. The permanent strain portion is a portion in the rotating shaft to which a permanent strain is applied by twisting the fixed portions.

10 Claims, 19 Drawing Sheets

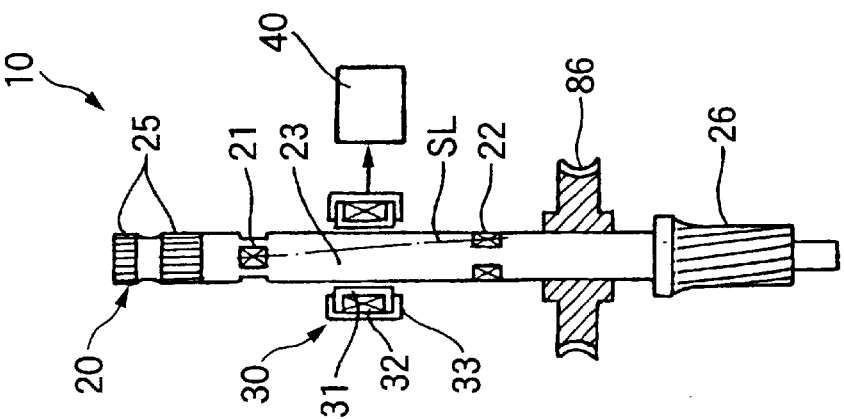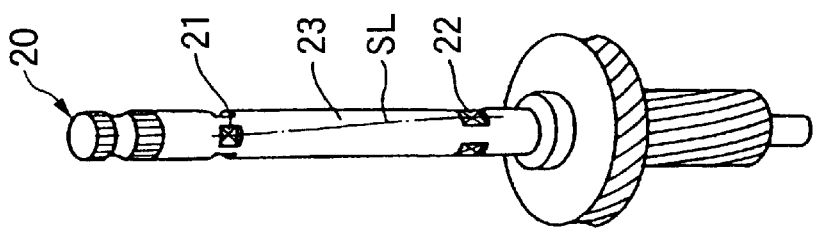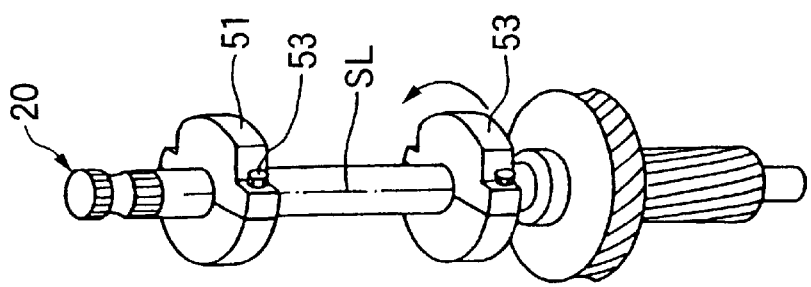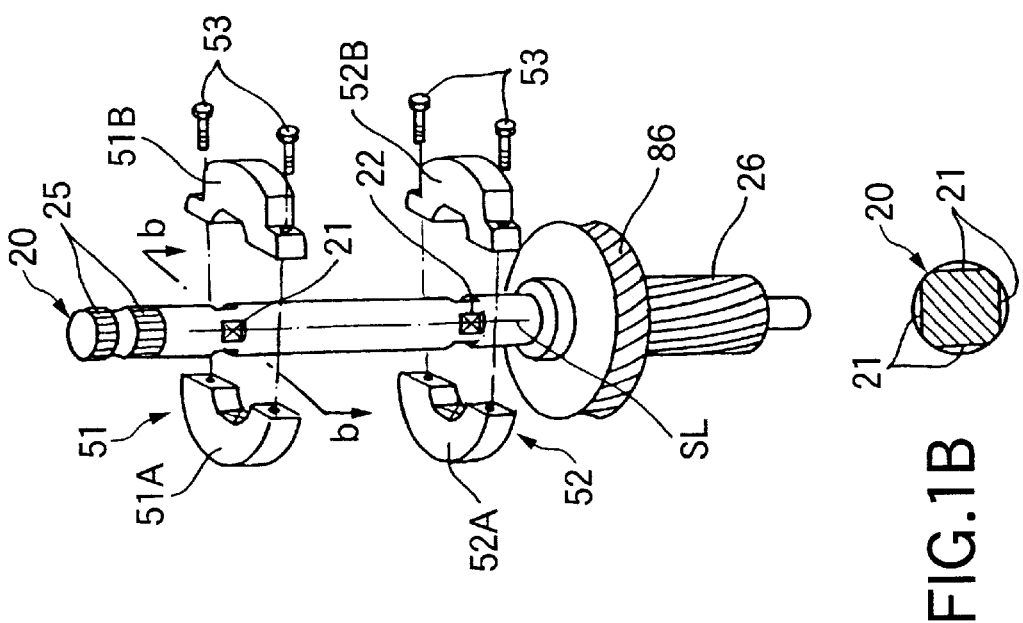

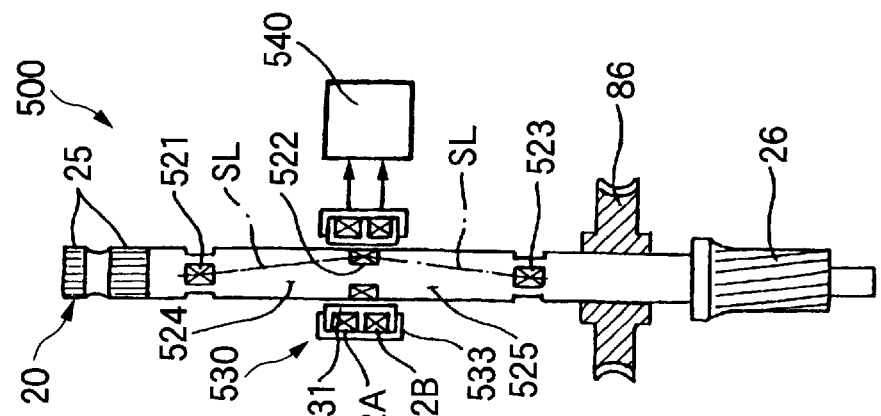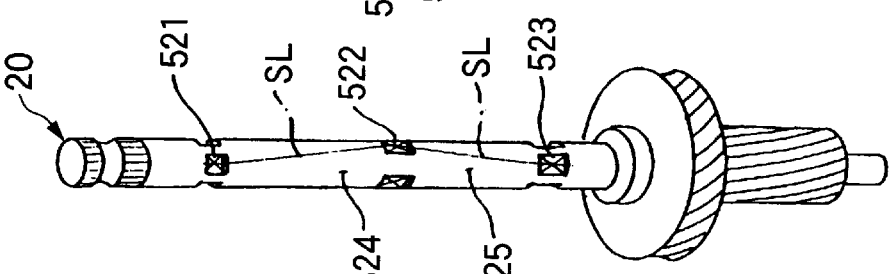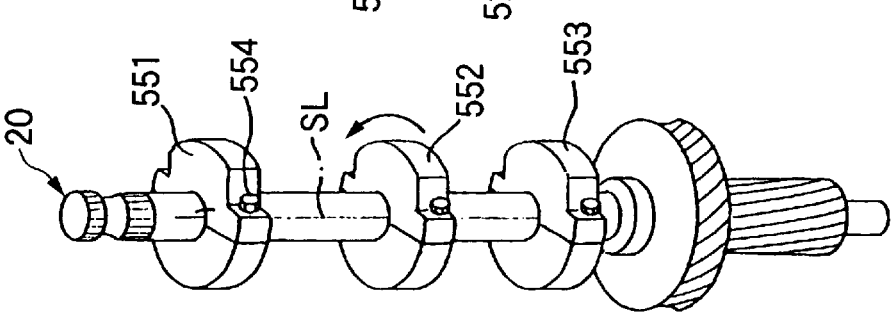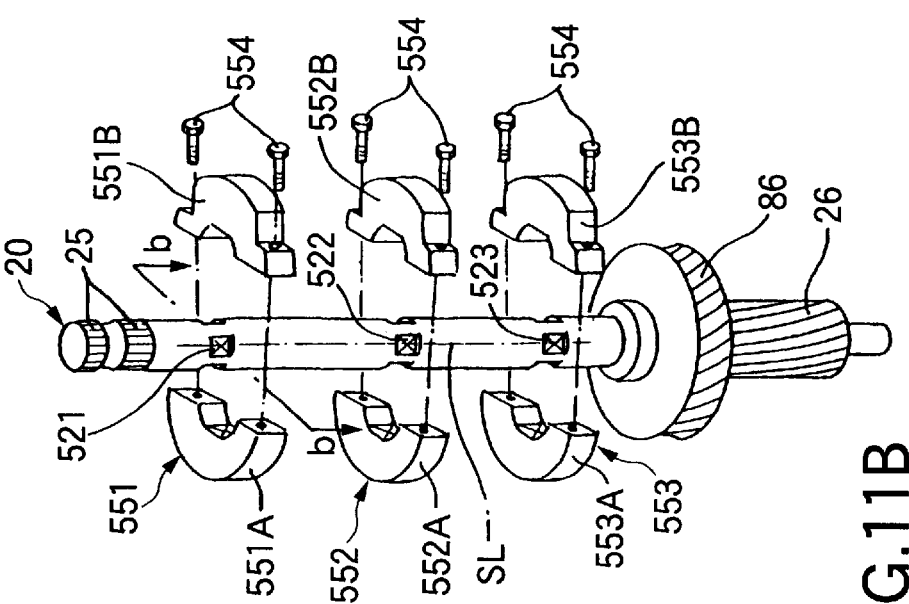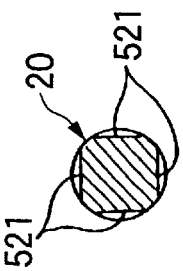

TORQUE DETECTING DEVICE AND ELECTROMOTIVE POWER STEERING APPARATUS MOUNTING THE TORQUE DETECTING DEVICE THEREON

BACKGROUND OF THE INVENTION

1. Field of the Invention

The present invention relates to a torque detecting device and an electromotive power steering apparatus mounting the torque detecting device thereon.

2. Description of the Related Art

Of a large number of kinds of torque detecting devices for detecting a torque applied to a rotating shaft, there is typically used a torsion bar spring. As the torque detecting device of this kind, a "steering torque sensor" disclosed in JP-A-7-333082 has been known (which will be hereinafter referred to as the "related art"), for example.

According to this related art, as shown in FIG. 20, an input shaft 6 and an output shaft 7 are coupled to each other through a torsion bar spring 8, and a relative torsional angle between the input and output shafts 6 and 7 is detected by detecting coils 2a and 2b.

The torque detecting device can be mounted on an electromotive power steering apparatus. More specifically, a steering torque applied between the input and output shafts 6 and 7 through a steering wheel is detected by the torque detecting device, and an auxiliary torque corresponding to the steering torque is generated by an electric motor and is applied to a steering system through a reduction gear mechanism, so that the steering torque can be aided with the auxiliary torque. As a result, the steering force of a driver can be relieved to give a comfortable steering sense (steering feeling).

In the related art that the torsion bar spring 8 is used, a relative angle displacement is generated between the input and output shafts 6 and 7 by the torsion of the torsion bar spring 8 corresponding to the torque. In the case in which the torque detecting device is mounted on the electromotive power steering apparatus, a slight time delay is generated on the operation of wheels with respect to the steering operation of the steering wheel.

In particular, in the case in which the auxiliary torque is decreased according to an increase in a vehicle speed to increase the resisting feeling of the steering wheel, the amount of the torsion of the torsion bar spring 8 is increased during the steering when the vehicle speed is increased. The time delay generated according to the amount of the torsion finely influences the steering sense.

On the other hand, in the electromotive power steering apparatus, it is required that the steering sense of the driver should be enhanced as much as possible. In the case in which the conventional torque detecting device is mounted, however, a further enhancement in the steering sense is restricted.

SUMMARY OF THE INVENTION

It is an object of the invention to provide (1) a torque detecting device in which the delay of a torque transmission time from the torque input side to the torque output side can be eliminated and the direction and magnitude of an applied torque can be reliably detected with a simple structure and (2) an electromotive power steering apparatus to which such a torque detecting device can be applied.

In order to attain the object, a first aspect of the invention is directed to a torque detecting device wherein a pair of fixed portions are provided on a rotating shaft to have a predetermined distance in an axially longitudinal direction, a permanent strain portion to which a permanent strain is applied by twisting the fixed portions and which changes a magnetostrictive characteristic corresponding to an applied torque is provided between the fixed portions, and a detecting portion for electrically detecting a magnetostrictive effect produced in the permanent strain portion is provided around the permanent strain portion.

The rotating shaft of the torque detecting device is an integral shaft which is not divided into the torque input side and the torque output side. Therefore, when the torque is applied, a very small torsional angle (an angle displacement) is enough. Even if the torsional angle of the rotating shaft is small, it is possible to quickly detect the torque by detecting, through the detecting portion, the magnetostrictive effect produced in the permanent strain portion corresponding to the torque.

Furthermore, there is provided the permanent strain portion for hanging a tool or a jig on a pair of fixed portions and twisting them, thereby applying an accurate permanent strain to the fixed portions in the rotating shaft. In the permanent strain portion, the magnetostrictive characteristic is changed according to the applied torque. By providing the permanent strain portion on the rotating shaft, the origin of the magnetostrictive characteristic curve of the permanent strain portion is shifted from the origin set before the application of the permanent strain. By detecting, through the detecting portion, the magnetostrictive effect produced in the permanent strain portion, it is possible to detect the direction and magnitude of the torque applied to the rotating shaft.

A second aspect of the invention is directed to a torque detecting device wherein a pair of fixed portions are provided on a rotating shaft to have a predetermined distance in an axially longitudinal direction, a magnetostrictive film which is formed of a plated layer to change a magnetostrictive characteristic corresponding to an applied torque and to which a strain is applied by twisting the fixed portions is provided on a surface of the rotating shaft and between the fixed portions with a predetermined width over a whole periphery, and a detecting portion for electrically detecting a magnetostrictive effect produced on the magnetostrictive film is provided around the magnetostrictive film.

The rotating shaft of the torque detecting device is an integral shaft which is not divided into the torque input side and the torque output side. Therefore, when the torque is applied, a very small torsional angle is enough. Even if the torsional angle of the rotating shaft is small, the torque can be detected quickly by detecting, through the detecting portion, the magnetostrictive effect produced in the magnetostrictive film corresponding to the torque.

Furthermore, there is provided the magnetostrictive film for hanging a tool or a jig on a pair of fixed portions and twisting them, thereby applying an accurate strain to the fixed portions in the rotating shaft. In the magnetostrictive film, the magnetostrictive characteristic is changed according to the applied torque. By providing the magnetostrictive film having a strain applied thereto on the rotating shaft, the origin of the magnetostrictive characteristic curve of the magnetostrictive film is shifted from the origin set before the application of the strain. By detecting the magnetostrictive effect produced in the rotating shaft by the detecting portion, it is possible to detect the direction and magnitude of the torque applied to the rotating shaft.

Moreover, it is sufficient that the torque to twist the rotating shaft is so small as to apply a strain to the magnetostrictive film. The torque is such as to loosely twist the rotating shaft in an elastic region. Since it is not necessary to input an excess torque to the fixed portion, the torque can be managed more easily, and furthermore, precision in the torque can be increased. In addition, the torque is such as to loosely twist the rotating shaft in the elastic region. Therefore, equipment for inputting a torque to the fixed portion can have a simple and light structure.

A third aspect of the invention is directed to an electromotive power steering apparatus mounting the torque detecting device according to the first or second aspect of the invention as a steering torque sensor for detecting a steering torque of a steering system which is generated on a wheel for a vehicle.

In the third aspect of the invention, the rotating shaft is a pinion shaft to be rotated through a universal joint by means of the steering wheel, one of the fixed portions is a spline coupling portion or a serration coupling portion which is formed on one of ends of the pinion shaft which is to be coupled to the universal joint, and the other fixed portion is a pinion of a rack and pinion mechanism to be coupled to a steering wheel.

The rotating shaft of the torque detecting device mounted on the electromotive power steering apparatus is an integral shaft which is not divided into the torque input side and the torque output side. Therefore, when a steering torque is applied, a very small torsional angle is enough. For this reason, a time delay is not caused on the operation of the wheel as compared with the steering of a steering wheel. Accordingly, it is possible to further increase the responsiveness of the electromotive power steering apparatus which generates an auxiliary torque corresponding to the steering torque and aids. Consequently, a steering sense can be enhanced still more.

In particular, also in the case in which the resisting feeling of the steering wheel is increased by decreasing the auxiliary torque corresponding to an increase in a vehicle speed, the torsional angle of the rotating shaft may be very small. Consequently, when steering the steering wheel, a steering angle thereof can be directly transmitted to the wheel so that comfortable steering having a high responsiveness can be carried out.

Furthermore, the spline coupling portion or the serration coupling portion in the rotating shaft is also used for one of the fixed portions and the pinion of the rotating shaft is also used for the other fixed portion. Therefore, it is not necessary to provide the fixed portion to be twisted by hanging a tool or a jig thereon. Accordingly, the rigidity of the rotating shaft can be further increased.

A fourth aspect of the invention is directed to a torque detecting device wherein a first fixed portion, a second fixed portion and a third fixed portion are sequentially provided on a rotating shaft to have a predetermined distance in an axially longitudinal direction, a first permanent strain portion to which a permanent strain is applied by twisting the first and second fixed portions and which changes a magnetostrictive characteristic corresponding to an applied torque is provided between the first and second fixed portions, a second permanent strain portion to which a permanent strain different from that of the first permanent strain portion is applied by twisting the second and third fixed portions and which changes a magnetostrictive characteristic corresponding to an applied torque is provided between the second and third fixed portions, and a detecting portion for electrically detecting a magnetostrictive effect produced in the first and second permanent strain portions is provided around the first and second permanent strain portions.

The rotating shaft of the torque detecting device is an integral shaft which is not divided into the torque input side and the torque output side. Therefore, when the torque is applied, a very small torsional angle is enough. Even if the torsional angle of the rotating shaft is small, the torque can be detected quickly by detecting, through the detecting portion, the magnetostrictive effect produced in the permanent strain portion corresponding to the torque.

Furthermore, the first and second permanent strain portions to which accurate permanent strains different from each other are applied are provided between the first, second and third fixed portions in the rotating shaft by twisting the tools or jigs hung on the first, second and third fixed portions. In the first and second permanent strain portions, the magnetostrictive characteristics are changed corresponding to the applied torque. By providing the first and second permanent strain portions on the rotating shaft, the origins of the magnetostrictive characteristic curves of the first and second permanent strain portions are shifted from the origin set before the application of the permanent strain.

The magnetostrictive characteristic of the second permanent strain portion is different from that of the first permanent strain portion. It is possible to detect the direction and magnitude of the torque applied to the rotating shaft by detecting, through the detecting portion, each of the magnetostrictive effects produced in the first and second permanent strain portions having the magnetostrictive characteristics different from each other, and furthermore, to carry out the failure diagnosis of the torque detecting device by comparing two different detection values.

In addition, if a difference between the two different detection values is varied within a torque measurement range, it is possible to eliminate the influence of a temperature characteristic, thereby obtaining a stable signal characteristic based on the difference between the two detection values. Thus, it is possible to obtain a more excellent torque detection signal which is not varied according to a change in an environmental temperature.

A fifth aspect of the invention is directed to a torque detecting device wherein a first fixed portion, a second fixed portion and a third fixed portion are sequentially provided on a rotating shaft to have a predetermined distance in an axially longitudinal direction, a first magnetostrictive film which is formed of a plated layer to change a magnetostrictive characteristic corresponding to an applied torque and to which a strain is applied by twisting the first and second fixed portions is provided on a surface of the rotating shaft and between the first and second fixed portions with a predetermined width over a whole periphery, a second magnetostrictive film which is formed of a plated layer to change a magnetostrictive characteristic corresponding to an applied torque and to which a different strain from that of the first magnetostrictive film is applied by twisting the second and third fixed portions is provided on the surface of the rotating shaft and between the second and third fixed portions with a predetermined width over a whole periphery, and a detecting portion for electrically detecting a magnetostrictive effect produced in the first and second magnetostrictive films is provided around the first and second magnetostrictive films.

The rotating shaft of the torque detecting device is an integral shaft which is not divided into the torque input side and the torque output side. Therefore, when the torque is applied, a very small torsional angle is enough. Even if the torsional angle of the rotating shaft is small, the torque can be detected quickly by detecting, through the detecting portion, the magnetostrictive effect produced in the first and second magnetostrictive films corresponding to the torque.

Furthermore, the first and second magnetostrictive films to which accurate strains different from each other are applied are provided between the first, second and third fixed portions in the rotating shaft by twisting tools or jigs hung on the first, second and third fixed portions. In the first and second magnetostrictive films, the magnetostrictive characteristics are changed corresponding to the applied torque. By providing the first and second magnetostrictive films on the rotating shaft, the origins of the magnetostrictive characteristic curves of the first and second magnetostrictive films are shifted from the origin set before the application of the strain.

The magnetostrictive characteristic of the second magnetostrictive film is different from that of the first magnetostrictive film. It is possible to detect the direction and magnitude of the torque applied to the rotating shaft by detecting, through the detecting portion, each of the magnetostrictive effects produced in the first and second magnetostrictive films having the magnetostrictive characteristics different from each other, and furthermore, to carry out the failure diagnosis of the torque detecting device by comparing two different detection values.

In addition, if a difference between the two different detection values is varied within a torque measurement range, it is possible to eliminate the influence of a temperature characteristic, thereby obtaining a stable signal characteristic based on the difference between the two detection values. Thus, it is possible to obtain a more excellent torque detection signal which is not varied according to a change in an environmental temperature.

Moreover, it is sufficient that the torque to twist the rotating shaft is so small as to apply a strain to the first and second magnetostrictive films. The torque is such as to loosely twist the rotating shaft in an elastic region. Since it is not necessary to input an excess torque to the first, second and third fixed portions, the torque can be managed more easily, and furthermore, precision in the torque can be increased. In addition, the torque is such as to loosely twist the rotating shaft in the elastic region. Therefore, equipment for inputting a torque to the first, second and third fixed portions can have a simple and light structure.

A sixth aspect of the invention is directed to an electromotive power steering apparatus mounting the torque detecting device according to the fourth or fifth aspect of the invention as a steering torque sensor for detecting a steering torque of a steering system which is generated on a wheel for a vehicle.

In the sixth aspect of the invention, the rotating shaft is a pinion shaft to be rotated through a universal joint by means of the steering wheel, the first fixed portion is a spline coupling portion or a serration coupling portion which is formed on one of ends of the pinion shaft which is to be coupled to the universal joint, and the third fixed portion is a pinion of a rack and pinion mechanism to be coupled to a steering wheel.

The rotating shaft of the torque detecting device mounted on the electromotive power steering apparatus is an integral shaft which is not divided into the torque input side and the torque output side. Therefore, when a steering torque is applied, a very small torsional angle is enough. For this reason, a time delay is not caused on the operation of the wheel as compared with the steering of a steering wheel. Accordingly, it is possible to further increase the responsiveness of the electromotive power steering apparatus which generates an auxiliary torque corresponding to the steering torque and aids. Consequently, a steering sense can be enhanced still more.

In particular, also in the case in which the resisting feeling of the steering wheel is increased by decreasing the auxiliary torque corresponding to an increase in a vehicle speed, the torsional angle of the rotating shaft may be very small. Consequently, when steering the steering wheel, a steering angle thereof can be directly transmitted to the wheel so that comfortable steering having a high responsiveness can be carried out.

Furthermore, the spline coupling portion or the serration coupling portion in the rotating shaft is also used for the first fixed portion and the pinion of the rotating shaft is also used for the third fixed portion. Therefore, the second fixed portion is enough for the fixed portion to be twisted by hanging a tool or a jig thereon. Accordingly, the rigidity of the rotating shaft can be further increased.

BRIEF DESCRIPTION OF THE DRAWINGS

FIGS. 1A to 1E are views illustrating a structure of a torque detecting device (a first embodiment) according to the invention and a procedure for manufacturing the torque detecting device;

FIGS. 11A to 11E are views illustrating a structure of a torque detecting device (a fifth embodiment) according to the invention and a procedure for manufacturing the torque detecting device;

DETAILED DESCRIPTION OF THE PREFERRED EMBODIMENTS

Figure 2:
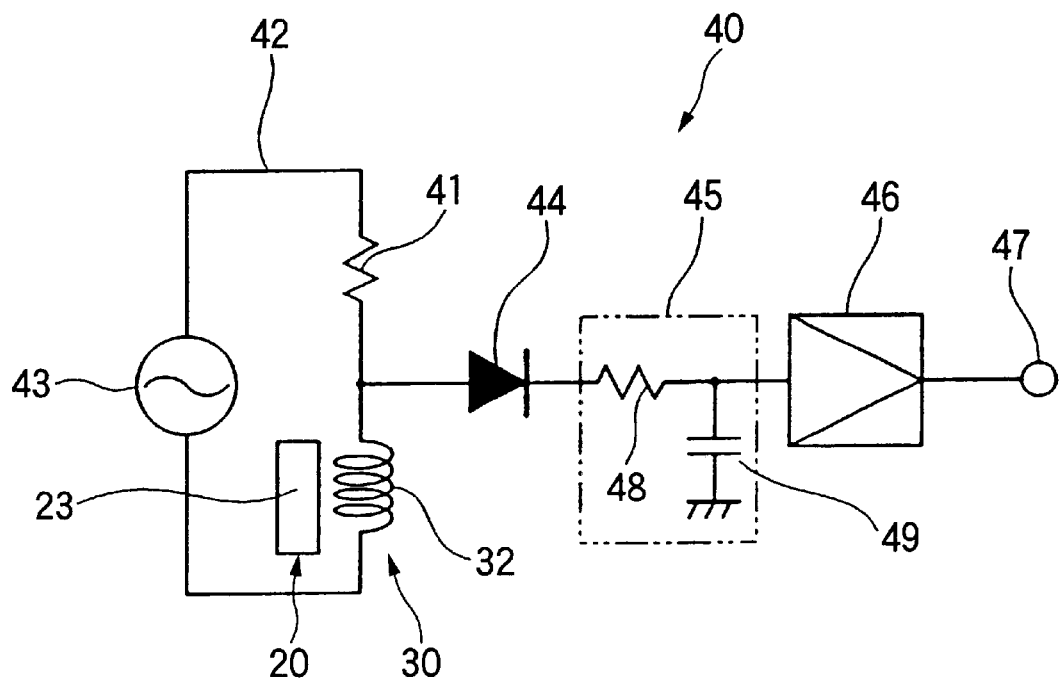
FIG. 2 is a circuit diagram showing the torque detecting device (the first embodiment) according to the invention.

Embodiments of the invention will be described below with reference to the accompanying drawings. The drawings are seen in the directions of designations.

First of all, a torque detecting device and an electromotive power steering apparatus mounting the torque detecting device thereon according to a first embodiment will be described with reference to FIGS. 1A to 6.

FIGS. 1A to 1E are views illustrating a structure of the torque detecting device according to the first embodiment of the invention and a procedure for manufacturing the torque detecting device.

A torque detecting device 10 according to the first embodiment shown in FIG. 1E is a magnetostriction type torque sensor. A permanent strain portion 23 to which a permanent strain is applied for changing a magnetostrictive characteristic corresponding to an applied torque is disposed on a cylindrical rotating shaft 20. A detecting portion 30 for electrically detecting a magnetostrictive effect produced in the permanent strain portion 23 is disposed around the permanent strain portion 23. The detection signal of the detecting portion 30 is processed by an output circuit portion 40 to output a torque detection signal.

The rotating shaft 20 is formed of a ferromagnetic material such as a nickel-chromium-molybdenum steel product (JIS-G-4103, mark; SNCM).

In the first embodiment, the rotating shaft 20 is provided with a pair of fixed portions 21 and 22 to have a predetermined distance in an axially longitudinal direction and a-permanent strain portion 23 to which a permanent strain is applied by twisting the fixed portions 21 and 22 is provided between the fixed portions 21 and 22.

The detecting portion 30 is provided to surround the permanent strain portion 23 of the rotating shaft 20. The detecting portion 30 includes a cylindrical coil bobbin 31 through which the rotating shaft 20 is inserted, a multilayered solenoid winding coil 32 (hereinafter referred to as a "coil 32") wound around the coil bobbin 31, and a back yoke 33 for magnetic shield for surrounding the coil 32.

The coil 32 is located within the magnetic circuit of the rotating shaft 20 with a very small void from the outer peripheral surface of the rotating shaft 20, thereby varying impedance according to a change in permeability when a torque is applied to the permanent strain portion 23.

Next, the procedure for providing the permanent strain portion 23 on the rotating shaft 20 and assembling the detecting portion 30 will be described with reference to FIGS. 1A to 1E.

FIG. 1B is a sectional view taken along a line b—b of FIG. 1A. As shown in FIGS. 1A and 1B, a pair of fixed portions 21 and 22 are respectively at least one pair of two or four flat surfaces formed by flattening outer peripheral surfaces of the rotating shaft 20. In order to provide the permanent strain portion 23 on the rotating shaft 20, tools 51 and 52 are hung on the upper and lower fixed portions 21 and 22 to twist the rotating shaft 20 by a predetermined angle, thereby applying a predetermined permanent strain.

For example, in FIG. 1A, two-divided (half) tools 51 and 52 are first abutted on the upper and lower fixed portions 21 and 22 and are assembled thereto with bolts 53. The tool 51 is a disc-shaped member having left and right tool halves 51A and 51B combined with each other. The tool 52 is a disc-shaped member obtained by combining left and right tool halves 52A and 52B.

In order to easily understand the "twist state" of the rotating shaft 20, a reference line SL extended in an axially longitudinal direction is described on the surface of the rotating shaft 20. Since the rotating shaft 20 in FIG. 1A is not twisted, the reference line SL is a straight line.

Next, as shown in FIG. 1C, one tool 51 is fixed and the other tool 52 is twisted. Alternatively, the upper and lower tools 51 and 52 are twisted in opposite directions to each other, thereby applying an excess torque for a predetermined time and plastically deforming the rotating shaft 20 to apply a permanent strain. At this time, the torque is approximately 30 to 40 Kgf·m, for example.

Then, the torque is eliminated and the tools 51 and 52 are removed from the upper and lower fixed portions 21 and 22. Thus, the permanent strain can be applied between the fixed portions 21 and 22 in the rotating shaft 20 as shown in FIG. 1D. A portion of the rotating shaft 20 to which the permanent strain is applied acts as the permanent strain portion 23. Since the rotating shaft 20 is twisted in this state, the reference line SL becomes spiral.

Thereafter, the detecting portion 30 is assembled to the rotating shaft 20 provided with the permanent strain portion 23 as shown in FIG. 1E. Thus, the torque detecting device 10 can be obtained.

As is apparent from the above description, the first embodiment is characterized in that a pair of fixed portions 21 and 22 are provided on the rotating shaft 20 to have a predetermined distance in an axially longitudinal direction, and by twisting the fixed portions 21 and 22, there is provided the permanent strain portion 23 to which the predetermined permanent strain is applied thereto.

The tools 51 and 52 or jigs can be hung on the pair of fixed portions 21 and 22 reliably and stably. Accordingly, it is possible to apply a predetermined permanent strain accurately and reliably between the fixed portions 21 and 22 in the rotating shaft 20 by twisting the tools 51 and 52 or the jigs by a predetermined angle.

FIG. 2 is a circuit diagram showing the torque detecting device according to the first embodiment of the invention.

In the output circuit portion 40 of the torque detecting device, an alternating current voltage (hereinafter referred to as "AC voltage") is applied from an alternating current (AC) voltage supply source 43 to a series circuit 42 in which the coil 32 and a resistor 41 having a constant resistance value are connected in series, and the change of the impedance of the coil 32 is converted into the AC voltage. The change of the impedance thus converted is fetched as the detection signal of the detecting portion 30, the detection signal having the AC voltage is rectified by a diode 44 and is then converted into a detection signal having less noise and a direct current voltage (hereinafter referred to as "DC voltage") through a low-pass filter 45. The detection signal having the DC voltage is amplified by an amplifier 46 and the signal thus amplified is output as a torque detection signal from an output terminal 47.

The diode 44 is connected to the series circuit 42 to obtain a rectifying circuit. The low-pass filter 45 is a smoothing circuit including a resistor 48 and a capacitor 49.

Figure 3:
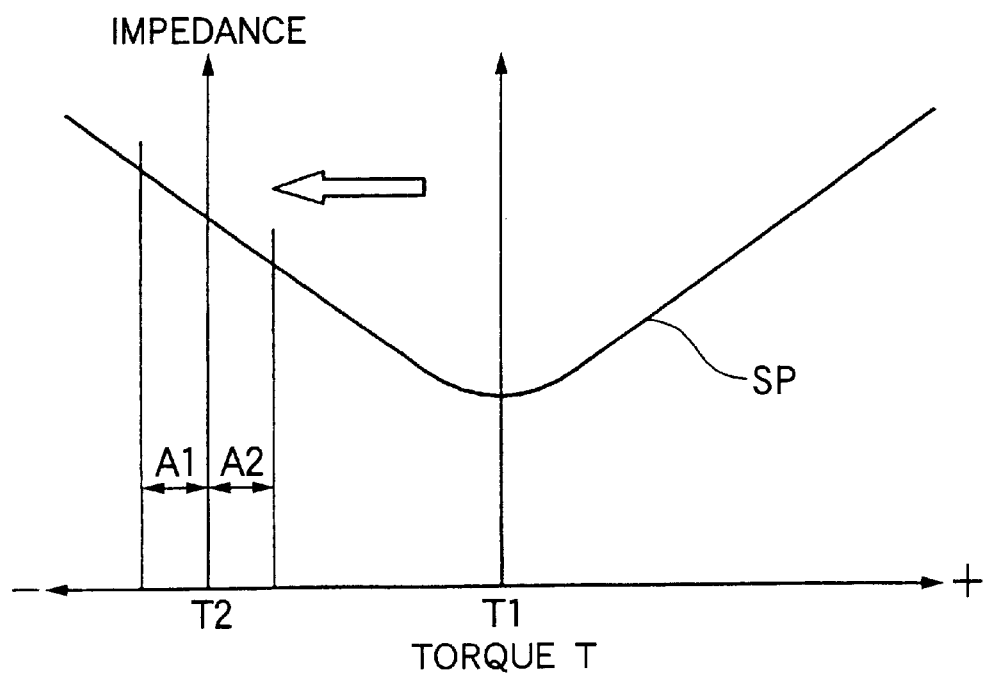
FIG. 3 is a magnetostrictive characteristic chart of the torque detecting device (the first embodiment) according to the invention.

FIG. 3 is a magnetostrictive characteristic chart of the torque detecting device according to the first embodiment of the invention, in which an axis of abscissa indicates a change in torque T applied to the rotating shaft and an axis of ordinate indicates a change in the impedance of the coil.

In a magnetostrictive characteristic curve SP, a right half from a torque origin T1 (a point having a torque T=0) in the axis of abscissa is a characteristic obtained when a clockwise torque is applied to the rotating shaft 20 and a left half from the torque origin T1 indicates a characteristic obtained when a counterclockwise torque is applied to the rotating shaft 20, and the left and right characteristics are linear symmetrical with a vertical line passing through the torque origin T1. For this reason, it is impossible to decide from the absolute value of the impedance of the coil 32, that is, the absolute value of the permeability of the rotating shaft 20 whether the clockwise or counterclockwise torque is applied.

Therefore, the inventors have investigated the relationship between the applied torque and the permeability of the magnetic rotating shaft 20. As a result, it has been found that the torque origin T1 of the rotating shaft 20 to be employed for the torque detecting device can be shifted to a torque origin T2 (torque T≈0) by twisting the rotating shaft 20 to apply a permanent strain. In other words, a torque application start point is moved.

As a result of the application of the permanent strain, the magnetostrictive characteristic curve SP has such a property that the left and right characteristics are asymmetrical with a vertical line passing through the torque origin T2. By using left and right constant ranges A1 and A2 in the magnetostrictive characteristic curve SP which set the torque origin T2 as a reference, accordingly, the direction and magnitude of the torque can be found from the absolute value of the impedance.

As described above, by using the rotating shaft 20 to which the accurate permanent strain is applied, the permeability of the permanent strain portion 23 is varied according to the torque applied to the rotating shaft 20 shown in FIG. 2 and the change of the impedance in the coil 32 which is caused at this time is detected by the output circuit portion 40. Consequently, it is possible to accurately detect the direction and value of the torque.

Next, description will be given to an example in which the torque detecting device 10 according to the first embodiment is mounted on the electromotive power steering apparatus.

Figure 4:
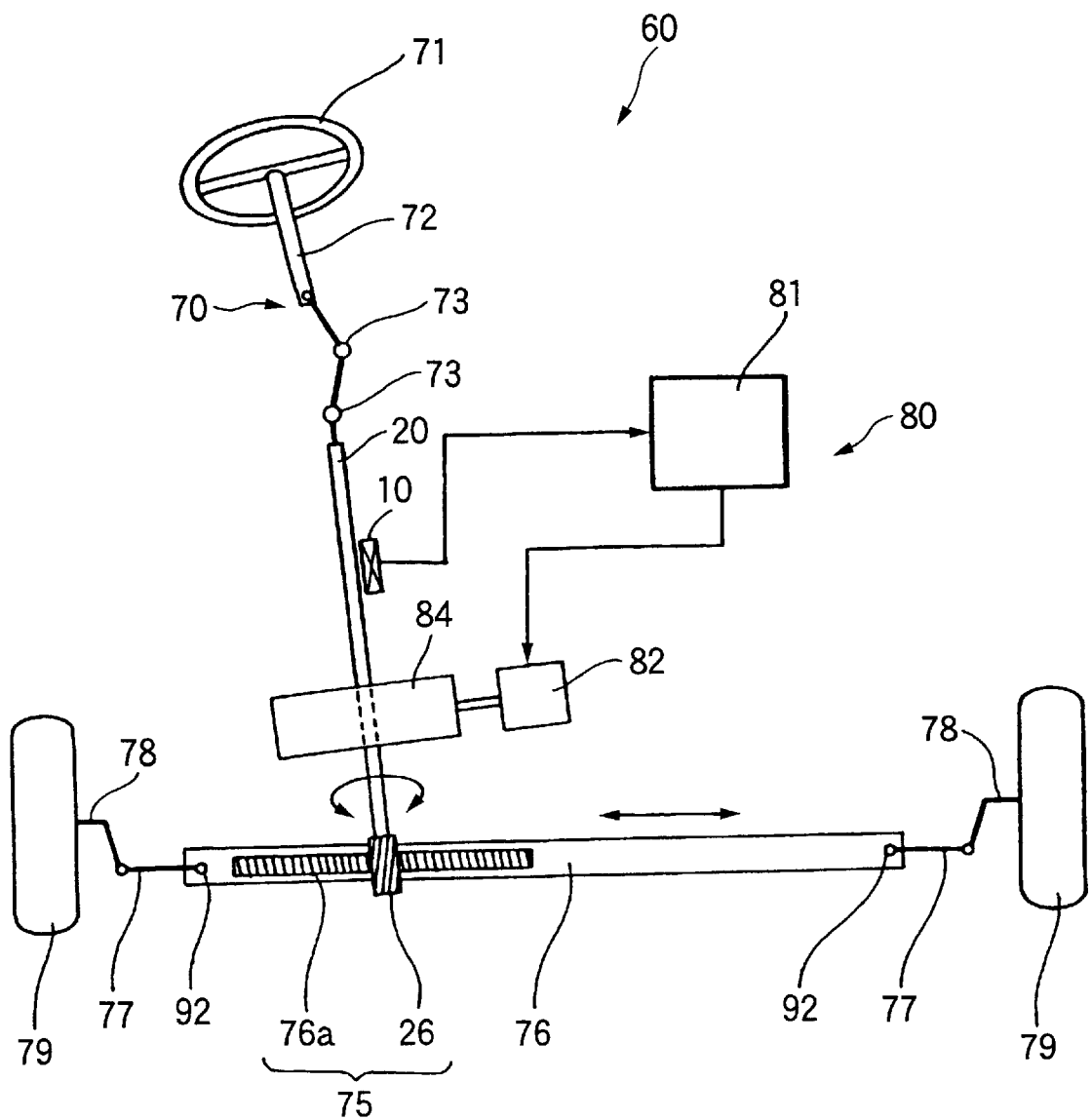
FIG. 4 is a typical view showing an electromotive power steering apparatus (the first embodiment) according to the invention.

FIG. 4 is a typical view showing the electromotive power steering apparatus according to the first embodiment of the invention.

An electromotive power steering apparatus 60 according to the first embodiment comprises a steering system 70 provided from a steering wheel 71 of a vehicle to wheels (front wheels) 79 and 79, and an auxiliary torque mechanism 80 for applying an auxiliary torque to the steering system 70.

In the steering system 70, the rotating shaft 20 is coupled to the steering wheel 71 through a steering shaft 72 and universal joints 73 and 73, and a rack shaft 76 is coupled to the rotating shaft 20 through a rack and pinion mechanism 75. Further, left and right wheels 79 and 79 are coupled to both ends of the rack shaft 76 through left and right tie rods 77 and 77 and knuckles 78 and 78.

The rack and pinion mechanism 75 has such a structure that a rack 76a formed on the rack shaft 76 is mated with a pinion 26 formed on the rotating shaft 20.

When a driver steers the steering wheel 71, the left and right wheels 79 and 79 can be steered with the steering torque through the rack and pinion mechanism 75 and the left and right tie rods 77 and 77.

In the auxiliary torque mechanism 80, the torque detecting device 10 detects the steering torque of the steering system 70 which is applied to the steering wheel 71. Control means 81 generates a control signal based on a torque detection signal, and then an electric motor 82 generates an auxiliary torque corresponding to the steering torque based on the control signal. The auxiliary torque is transmitted to the rack and pinion mechanism 75 of the steering system 70 through a reduction gear mechanism 84 and the rotating shaft 20. Then, the left and right wheels 79 and 79 can be steered by the rack and pinion mechanism 75 and the left and right tie rods 77 and 77.

Accordingly, the wheels 79 and 79 can be steered with a compound torque obtained by adding the auxiliary torque of the electric motor 82 to the steering torque of the driver.

Figure 5:
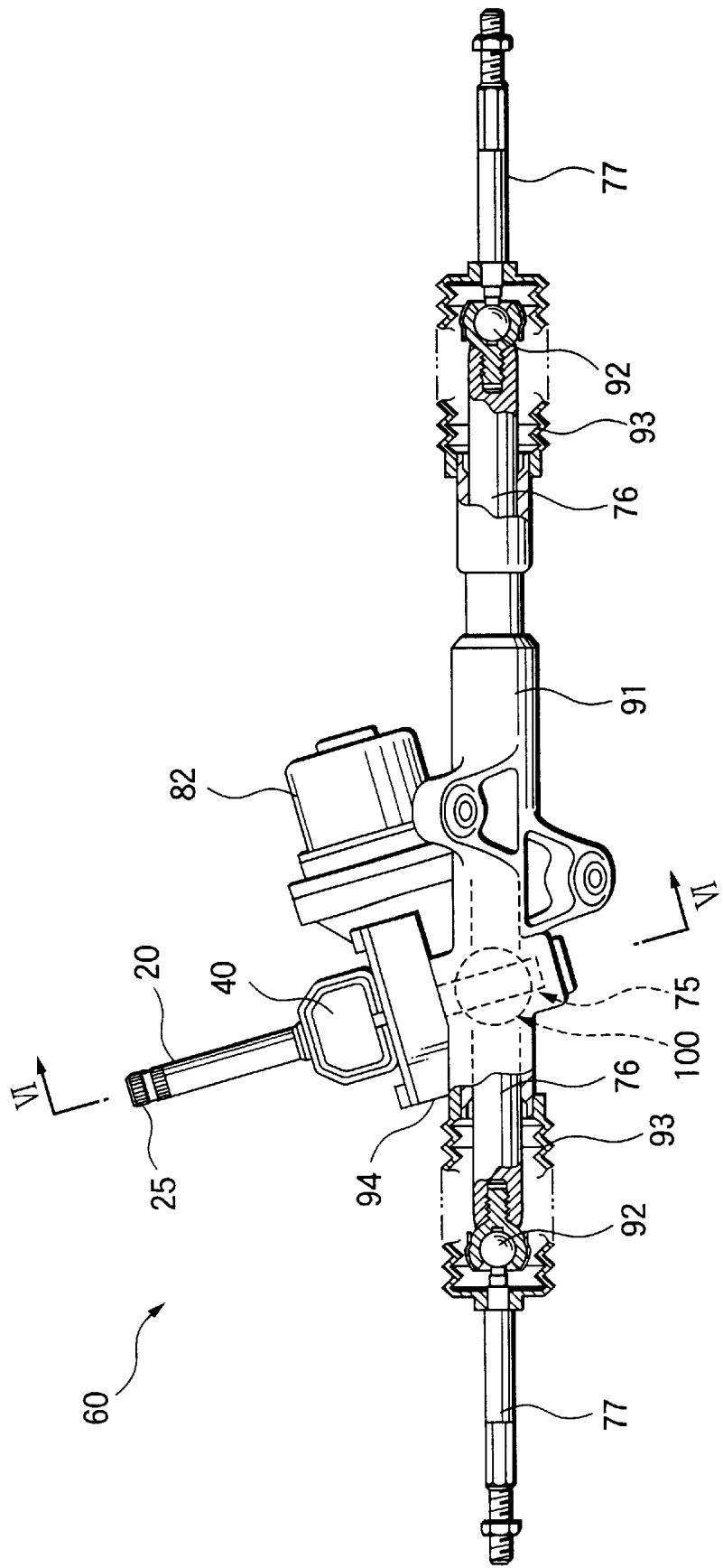
FIG. 5 is a view showing the whole structure of the electromotive power steering apparatus (the first embodiment) according to the invention.

FIG. 5 is a view showing the whole structure of the electromotive power steering apparatus according to the first embodiment of the invention, left and right ends being taken away in section. FIG. 5 illustrates that the rack shaft 76 of the electromotive power steering apparatus 60 is accommodated slidably in an axial direction in a housing 91 extended in the direction of the width of a vehicle (a transverse direction in the drawing).

The rack shaft 76 has the tie rods 77 and 77 coupled through ball joints 92 and 92 on both ends in a longitudinal direction which are protruded from the housing 91. The reference numerals 93 and 93 denote boots for dust seal.

Figure 6:
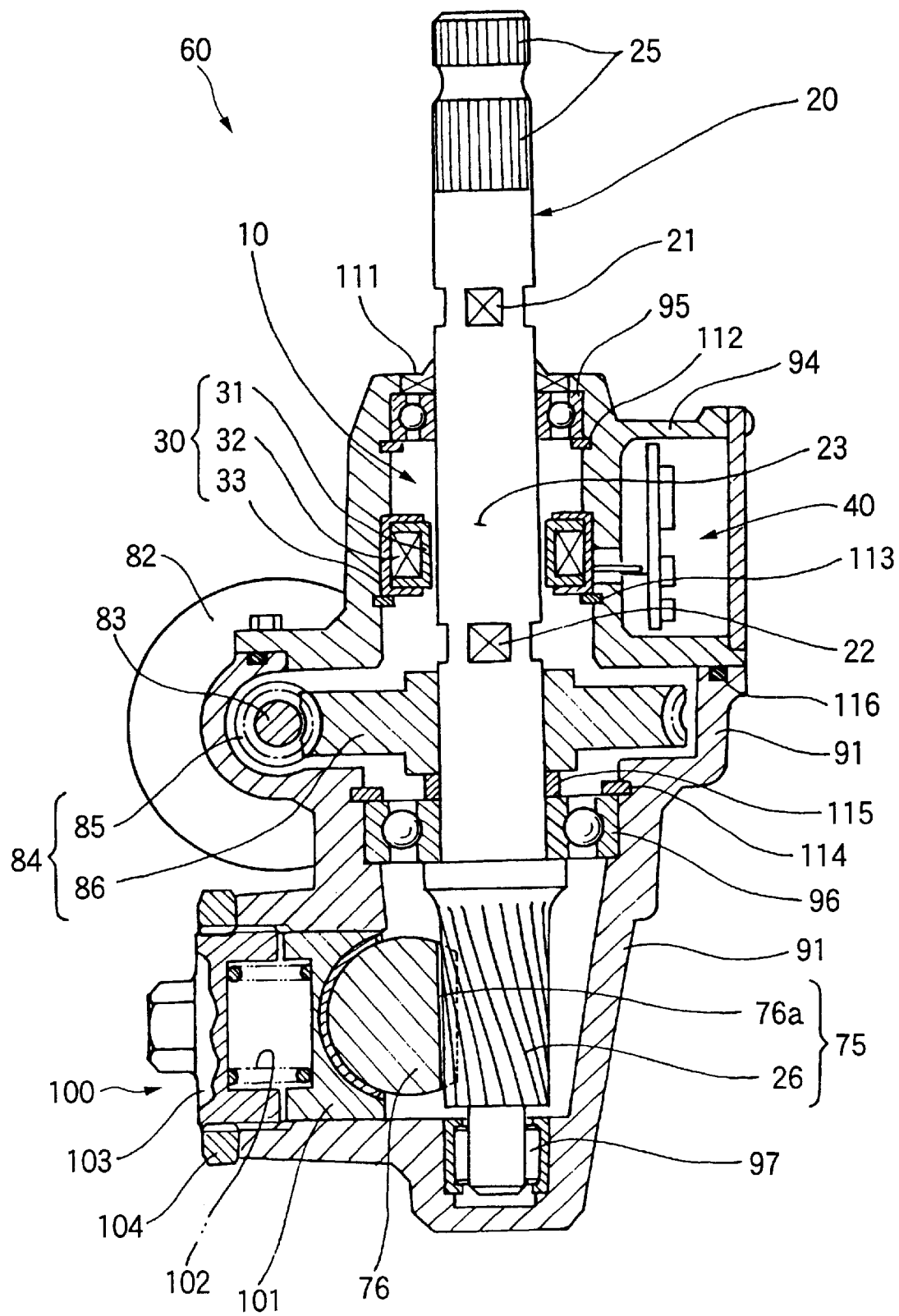
FIG. 6 is a sectional view taken along a line VI—VI in FIG. 5.

FIG. 6 is a sectional view taken along a line VI—VI in FIG. 5, illustrating the longitudinal sectional structure of the electromotive power steering apparatus 60.

The electromotive power steering apparatus 60 has such a structure that the torque detecting device 10, the rotating shaft 20, the rack and pinion mechanism 75 and the reduction gear mechanism 84 are accommodated in the housing 91 and the upper opening of the housing 91 is blocked by an upper cover portion 94. The torque detecting device 10 is attached to the upper cover portion 94.

The housing 91 rotatably supports the upper portion, longitudinal central portion and lower end of the rotating shaft 20 extended vertically through three bearings 95 to 97, and furthermore, attaches the electric motor 82 thereto and includes a rack guide 100.

The rotating shaft 20 is a pinion shaft to be rotated through the universal joint 73 by means of the steering wheel 71 as shown in FIG. 4. More specifically, the rotating shaft 20 has a spline coupling portion 25 or a serration coupling portion 25 to be coupled to the universal joint 73 formed on an upper end (one of the ends) and has a pinion 26 formed on a lower end (the other end).

The rack guide 100 serves to cause a guide portion 101 to abut on the rack shaft 76 on the opposite side of the rack 76a and to push the guide portion 101 with an adjusting bolt 103 through a compression spring 102, thereby providing a preload to the rack 76a and pushing the rack 76a against the pinion 26. Reference numeral 104 denotes a lock nut.

The reduction gear mechanism 84 is a worm gear mechanism for transmitting the auxiliary torque generated in the electric motor 82 to the rotating shaft 20, that is, a servo mechanism. In detail, the reduction gear mechanism 84 includes a worm 85 provided on the output shaft 83 of the electric motor 82, and a worm wheel 86 coupled to the rotating shaft 20 and mated with the worm 85. The worm wheel 86 is substantially coupled integrally with the rotating shaft 20 through shrink fitting.

In the drawing, reference numeral 111 denotes an oil seal, 112 to 114 denote a snap ring, 115 denotes a spacer, and 116 denotes an O-ring.

Next, description will be given to another embodiment of the torque detecting device and the electromotive power steering apparatus mounting the torque detecting device thereon. The same structures as those of the first embodiment shown in FIGS. 1 to 6 have the same reference numerals and description thereof will be omitted.

FIGS. 7A to 7F are views illustrating the structure of a torque detecting device according to a second embodiment of the invention and a procedure for manufacturing the torque detecting device.

A torque detecting device 200 according to the second embodiment shown in FIG. 7F is a magnetostriction type torque sensor. A magnetostrictive film 201 is provided on the surface of a rotating shaft 20 with a predetermined width W over a whole periphery. A detecting portion 30 for electrically detecting a magnetostrictive effect produced in the magnetostrictive film 201 is provided around the magnetostrictive film 201. An output circuit portion 40 processes the detection signal of the detecting portion 30 and outputs it as a torque detection signal.

The magnetostrictive film 201 comprises a plated layer having a predetermined thickness provided between a pair of fixed portions 21 and 22. The plated layer is a film in which a magnetostrictive characteristic is changed according to an applied torque and is characterized in that a strain is applied by twisting the fixed portions 21 and 22.

The magnetostrictive film 201 is formed of a material having a great change in a magnetic flux density corresponding to the change of the strain, for example, an Ni—Fe based alloy film formed on the outer peripheral surface of the rotating shaft 20 by a vapor plating method. The alloy film has a thickness of approximately 5 to 20 $\mu$m, for example.

In the cases in which the Ni—Fe based alloy film contains approximately 20% by weight of Ni and approximately 50% by weight of Ni, a magnetostriction constant is increased so that the magnetostrictive effect tends to be enhanced. It is preferable that a material having such an Ni content rate should be used. For example, a material containing 50 to 60% by weight of Ni and Fe as a remainder is used for the Ni—Fe based alloy film. The magnetostrictive film 201 may be a ferromagnetic film or a Permalloy (Ni; approximately 78% by weight, Fe; remainder) or supermalloy (Ni; 78% by weight, Mo; 5% by weight, Fe; remainder) Ni represents nickel, Fe represents iron and Mo represents molybdenum.

As described above, the rotating shaft 20 is provided with the magnetostrictive film 201 to which a strain is applied. Therefore, when a torque is applied to the magnetostrictive film 201 through the rotating shaft 20, the permeability of the magnetostrictive film 201 is changed according to the torque. Then, the change of an impedance in the coil 32 shown in FIG. 2 which is generated at this time is detected by the output circuit portion 40 so that the direction and value of the torque can be detected.

Next, a procedure for providing the magnetostrictive film 201 having a strain on the rotating shaft 20 having the above-mentioned structure to assemble the detecting portion 30 will be described with reference to FIGS. 7A to 7F. FIG. 7B is a sectional view taken along a line b—b of FIG. 7A.

Since the procedure shown in FIGS. 7A to 7C is the same as the procedure shown in FIGS. 1A to 1C, description will be omitted. However, a torque to be applied when twisting the rotating shaft 20 and a torque application time are smaller than those of the first embodiment and are such as not to cause a permanent strain to remain in the rotating shaft 20 itself. More specifically, the rotating shaft 20 is loosely twisted in an elastic region. The torque is approximately 3 to 6 Kgf·m, for example.

FIG. 7D shows a state in which the rotating shaft 20 is twisted. Since the rotating shaft 20 is twisted in this state, a reference line SL is spiral. In the twist state, next, plating is carried out over the outer peripheral surface of the rotating shaft 20 and in a predetermined position between the fixed portions 21 and 22 so that the magnetostrictive film 201 comprising a plated layer is formed.

In order to easily understand the "twist state" of the magnetostrictive film 201, a reference line SL1 extended in an axially longitudinal direction is described on the surface of the magnetostrictive film 201. Since the magnetostrictive film 201 is not twisted in FIG. 7D, the reference line SL1 is a straight line in the axially longitudinal direction.

Then, the torque is eliminated to restore the twist state of the rotating shaft 20 and tools 51 and 52 are removed from the upper and lower fixed portions 21 and 22. Since the rotating shaft 20 is not twisted in this state, the reference line SL is returned to a straight line in the axially longitudinal direction as shown in FIG. 7E. Moreover, since the magnetostrictive film 201 is twisted, the reference line SL1 becomes spiral.

By permanently deforming the magnetostrictive film 201 as shown in FIG. 7E, thus, a strain can be permanently applied to the magnetostrictive film 201 as a result. In other words, the strain permanently remains in the magnetostrictive film 201 by only restoring the twisted rotating shaft 20.

Then, it is possible to obtain the torque detecting device 200 by assembling the detecting portion 30 to the rotating shaft 20 provided with the magnetostrictive film 201 as shown in FIG. 7F.

According to the second embodiment, the torque twisting the rotating shaft 20 can be so small as to apply a strain to the magnetostrictive film 201 as a result. The torque is such as to loosely twist the rotating shaft 20 in the elastic region. As in the first embodiment, since it is not necessary to input an excess torque to the fixed portions 21 and 22, the torque can be managed more easily. In addition, since the rotating shaft 20 is loosely twisted in the elastic region, equipment for inputting a torque to the fixed portions 21 and 22 can have a simple and light structure.

Furthermore, since the input torque is small, the sizes of the fixed portions 21 and 22 provided on the rotating shaft 20 can be reduced. More specifically, it is possible to shallow flat surfaces to be the fixed portions 21 and 22 shown in FIG. 7B. Correspondingly, the diameter of the rotating shaft 20 can be increased so that the torsional rigidity of the rotating shaft 20 can be increased still more.

In the procedure of FIGS. 7A to 7F, the permanent strain may be-applied to the magnetostrictive film 201 in such a manner that (1) the fixed portions 21 and 22 in the rotating shaft 20 are subjected to the plating to form the magnetostrictive film 201, (2) the tools 51 and 52 are then hung on the fixed portions 21 and 22 to twist the rotating shaft 20, and (3) the magnetostrictive film 201 is plastically deformed to apply a predetermined permanent strain.

Next, description will be given to an example in which the torque detecting device 200 having the structure and function described above is mounted on an electromotive power steering apparatus.

Figure 8:
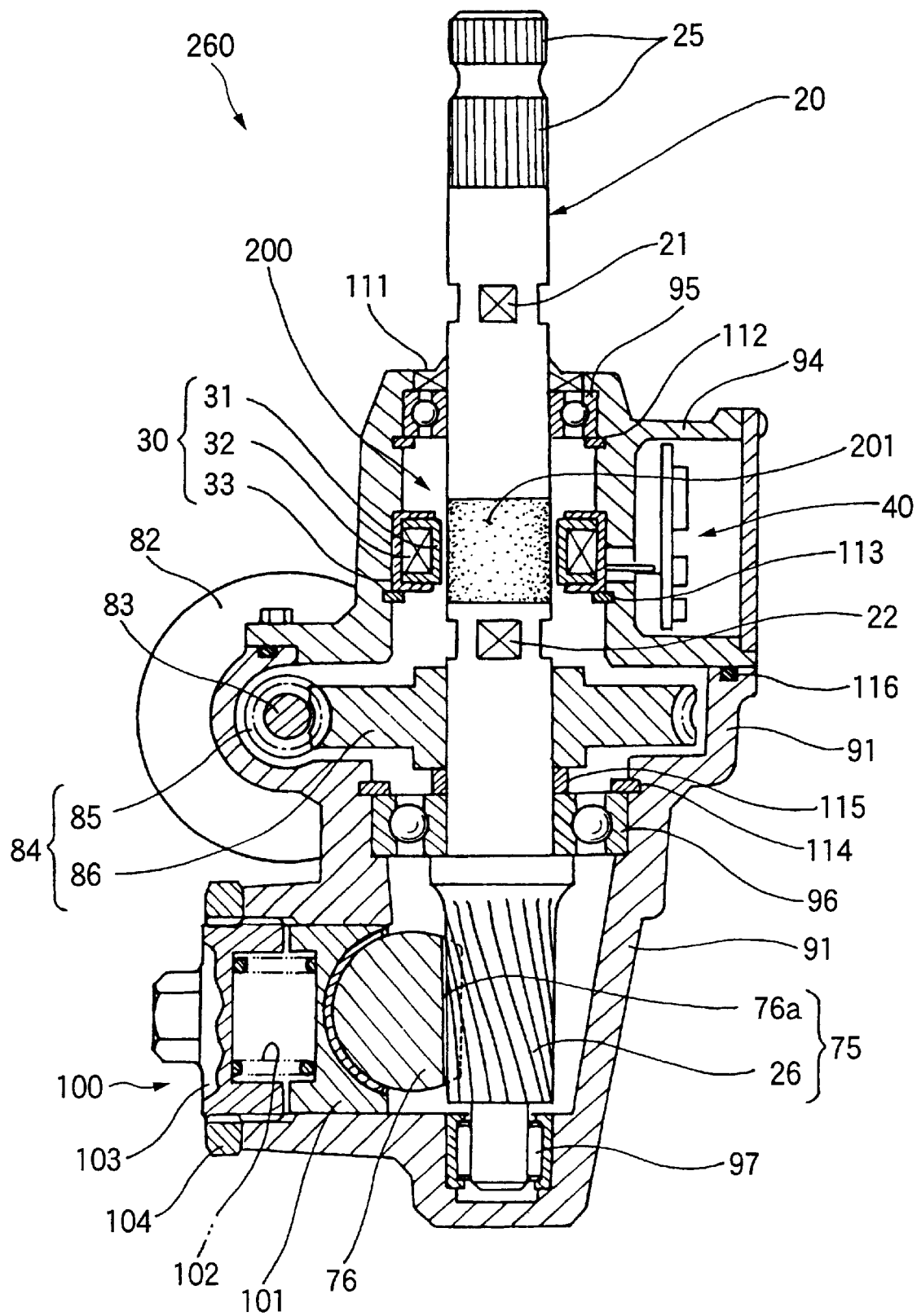
FIG. 8 is a longitudinal sectional view showing an electromotive power steering apparatus (the second embodiment) according to the invention.

FIG. 8 is a longitudinal sectional view showing an electromotive power steering apparatus according to the second embodiment of the invention corresponding to FIG. 6.

An electromotive power steering device 260 according to the second embodiment is characterized in that the magnetostrictive film 201 to which a strain is applied is provided in the rotating shaft 20. Other structures are the same as those in FIGS. 4 to 6 and description will be omitted.

Figure 9:
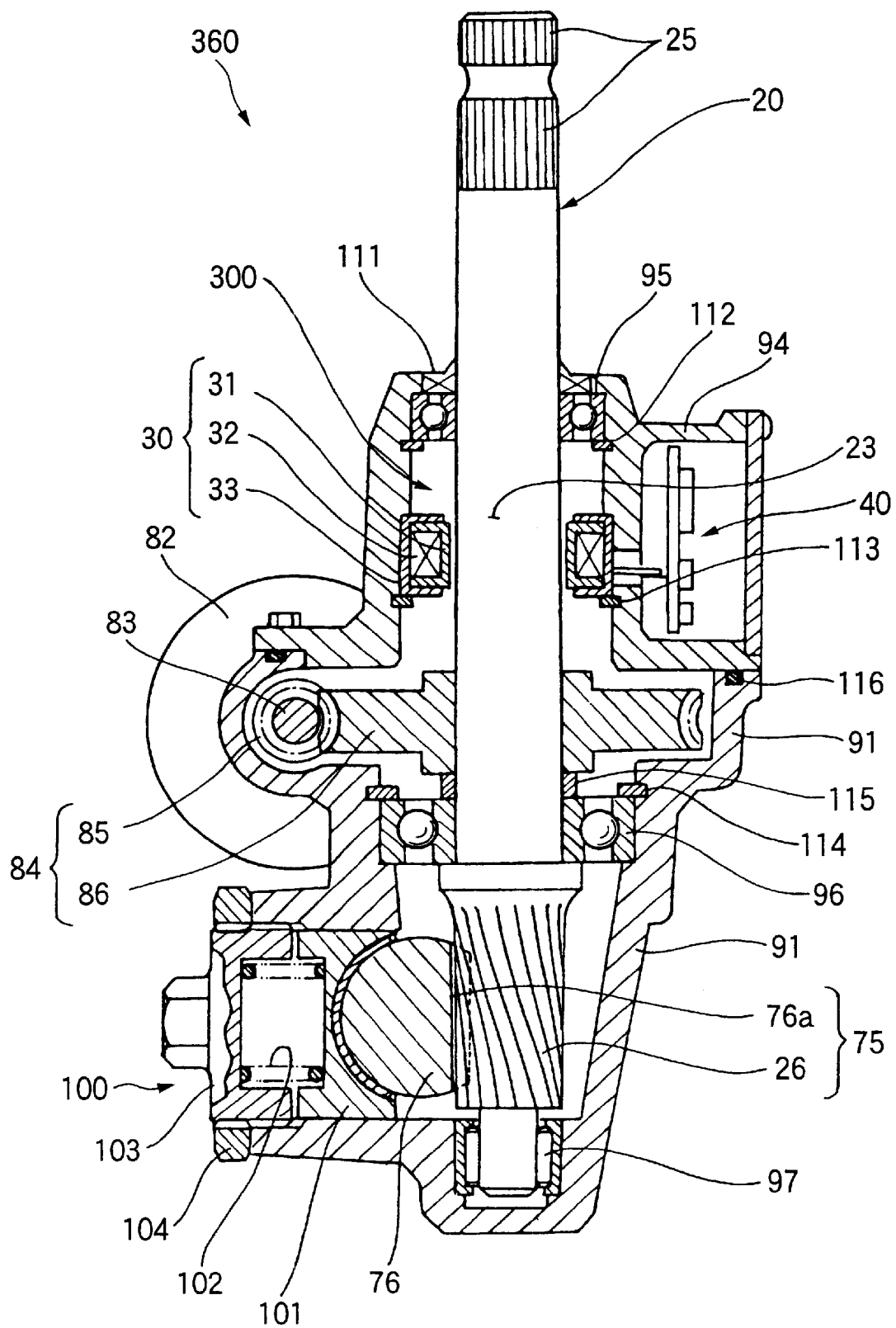
FIG. 9 is a longitudinal sectional view showing an electromotive power steering apparatus (a third embodiment) according to the invention.

FIG. 9 is a longitudinal sectional view showing an electromotive power steering apparatus according to a third embodiment of the invention corresponding to FIG. 6.

A torque detecting device 300 and an electromotive power steering apparatus 360 mounting the torque detecting device 300 thereon according to the third embodiment are characterized in that (1) a pair of fixed portions 21 and 22 are not provided, (2) a spline coupling portion 25 or a serration coupling portion 25 of a rotating shaft 20 is also used for the fixed portion 21, and (3) a pinion 26 of the rotating shaft 20 is also used for the fixed portion 22 as compared with the torque detecting device 10 and the electromotive power steering apparatus 60 according to the first embodiment shown in FIGS. 1 to 6.

As described above, the rotating shaft 20 is substantially coupled integrally with a worm wheel 86 in an axially longitudinal center portion thereof. As a result, a rigidity is very great in the portion of the rotating shaft 20 to which the worm wheel 86 is coupled.

A tool is hung on the spline coupling portion 25 or the serration coupling portion 25 and a tool is hung on the pinion 26. When these tools are rotated to twist the rotating shaft 20, the rotating shaft 20 is not plastically deformed uniformly and wholly in the axially longitudinal direction. The rotating shaft 20 is plastically deformed between the spline coupling portion 25 or the serration coupling portion 25 and the worm wheel 86 coupling portion, that is, in a portion in which the sectional area in a radial direction is almost equal. Accordingly, a permanent strain portion 23 according to the third embodiment can also obtain the same magnetostrictive characteristic as that of the first embodiment shown in FIG. 6.

In addition, it is not necessary to specially provide a fixed portion for hanging a tool or a jig on the rotating shaft 20 to be twisted. Accordingly, the rigidity of the rotating shaft 20 can be enhanced still more.

Figure 10:
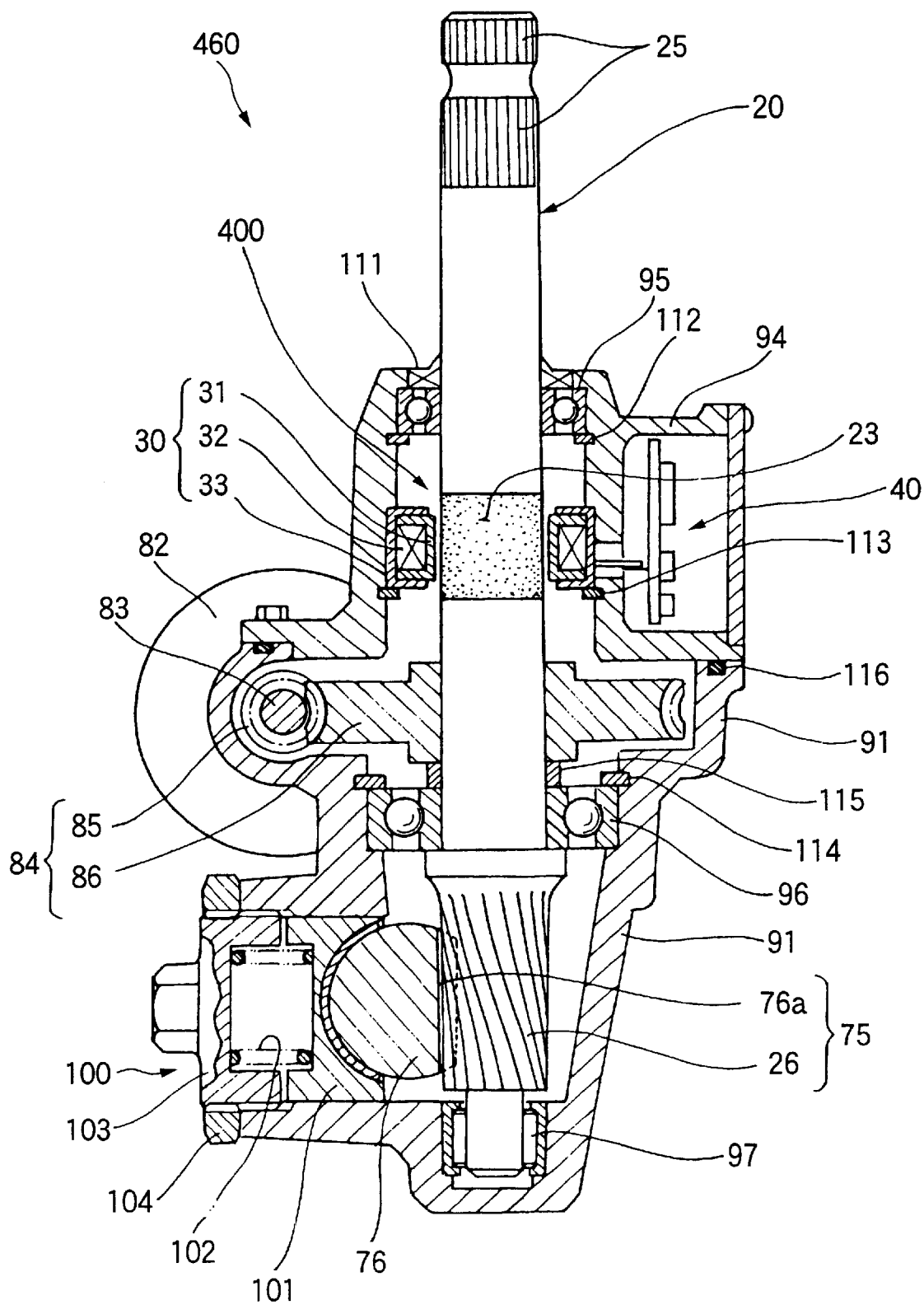
FIG. 10 is a longitudinal sectional view showing an electromotive power steering apparatus (a fourth embodiment) according to the invention.

FIG. 10 is a longitudinal sectional view showing an electromotive power steering apparatus according to a fourth embodiment of the invention corresponding to FIG. 8.

Figure 7:
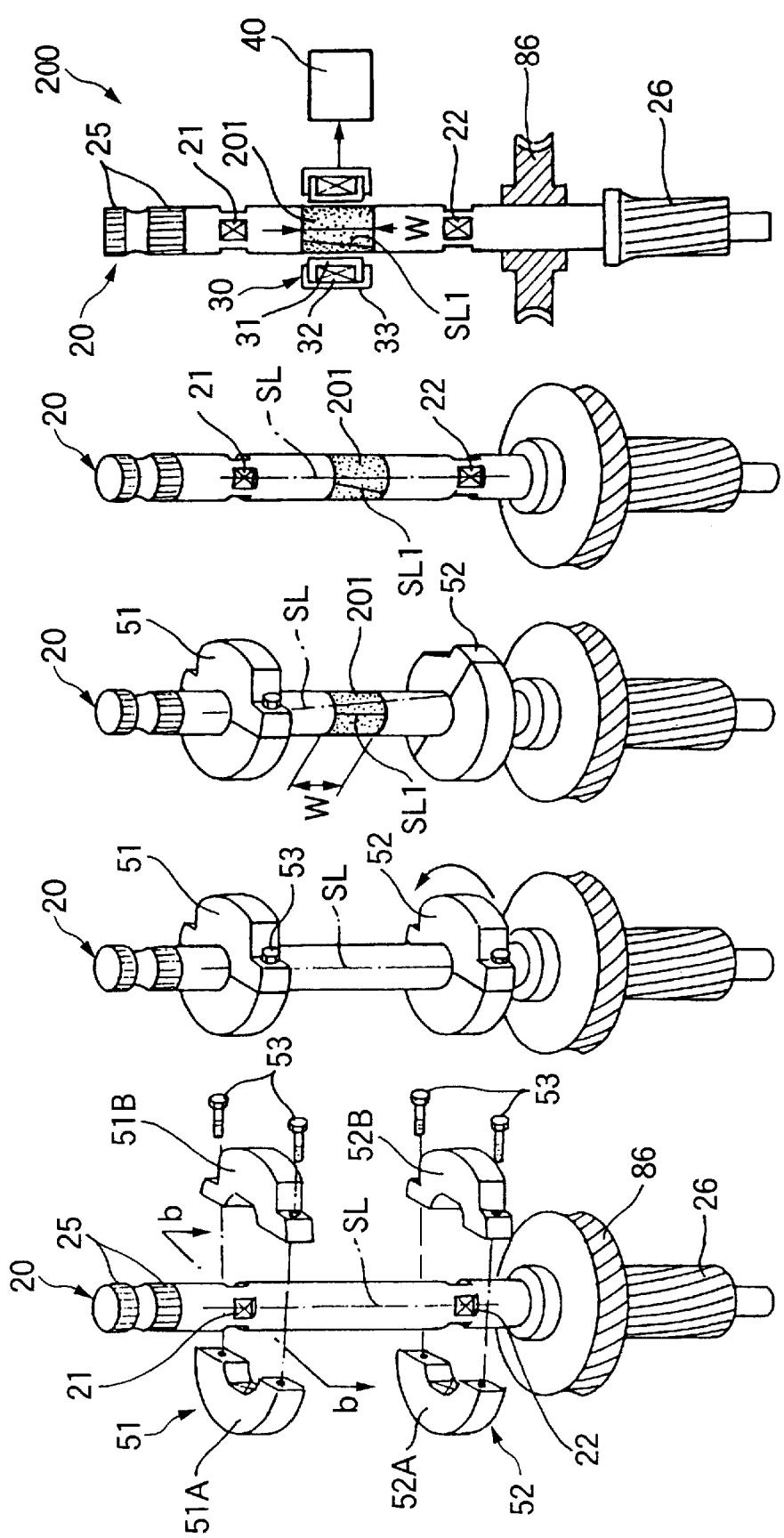
FIGS. 7A to 7F are views illustrating a structure of a torque detecting device (a second embodiment) according to the invention and a procedure for manufacturing the torque detecting device.

A torque detecting device 400 and an electromotive power steering apparatus 460 mounting the torque detecting device 400 thereon according to the fourth embodiment are characterized in that (1) a pair of fixed portions 21 and 22 are not provided, (2) a spline coupling portion 25 or a serration coupling portion 25 of a rotating shaft 20 is also used for the fixed portion 21, and (3) a pinion 26 of the rotating shaft 20 is also used for the fixed portion 22 as compared with the torque detecting device 200 and the electromotive power steering apparatus 260 according to the second embodiment shown in FIGS. 7A to 8.

Also in the fourth embodiment, in the same manner as in the third embodiment, it is not necessary to specially provide a fixed portion for hanging a tool or a jig on the rotating shaft 20 to be twisted. Accordingly, the rigidity of the rotating shaft 20 can be enhanced still more.

FIGS. 11A to 11E are views illustrating the structure of a torque detecting device according to a fifth embodiment of the invention and a procedure for manufacturing the torque detecting device.

A torque detecting device 500 according to the fifth embodiment shown in FIG. 11E is a magnetostriction type torque sensor. A rotating shaft 20 is provided with a first permanent strain portion 524 and a second permanent strain portion 525 to which a permanent strain is applied and which change magnetostrictive characteristics corresponding to an applied torque. A detecting portion 530 for electrically detecting magnetostrictive effects produced in the first and second permanent strain portions 524 and 525 is provided around the first and second permanent strain portions 524 and 525. An output circuit portion 540 processes the detection signal of the detecting portion 530 and outputs it as a torque detection signal.

The fifth embodiment is characterized in that a first fixed portion 521, a second fixed portion 522 and a third fixed portion 523 are sequentially provided on the rotating shaft 20 to have a predetermined distance in an axially longitudinal direction, the first permanent strain portion 524 to which a permanent strain is applied by twisting the first and second fixed portions 521 and 522 and which changes a magnetostrictive characteristic according to an applied torque is provided between the first and second fixed portions 521 and 522, and a second permanent strain portion 525 to which a permanent strain is applied by twisting the second and third fixed portions 522 and 523 in an opposite direction to the first and second fixed portions 521 and 522 and which changes a magnetostrictive characteristic corresponding to an applied torque is provided between the second and third fixed portions 522 and 523.

The direction of the permanent strain of the second permanent strain portion 525 is opposite to the direction of the permanent strain of the first permanent strain portion 524.

The detecting portion 530 is provided to surround the first and second permanent strain portions 524 and 525 of the rotating shaft 20. In detail, the detecting portion 530 includes a cylindrical coil bobbin 531 inserting the rotating shaft 20 therethrough, a first multilayered solenoid winding coil 532A and a second multilayered solenoid winding coil 532B which are wound upon the coil bobbin 531, and a back yoke 533 for magnetic shield which surrounds the first and second multilayered solenoid winding coils 532A and 532B.

Hereinafter, the first multilayered solenoid winding coil 532A will be referred to as a "first coil 532A" and the second multilayered solenoid winding coil 532B will be referred to as a "second coil 532B".

The first coil 532A is provided in the magnetic circuit of the rotating shaft 20 to have a very small void from the outer peripheral surface of the rotating shaft 20 so that an impedance is varied according to the change of a permeability which is generated when a torque is applied to the first permanent strain portion 524.

The second coil 532B is provided in the magnetic circuit of the rotating shaft 20 to have a very small void from the outer peripheral surface of the rotating shaft 20 so that an impedance is varied according to the change of a permeability which is generated when a torque is applied to the second permanent strain portion 525.

Next, the procedure for providing the first and second permanent strain portions 524 and 525 on the rotating shaft 20 to assemble the detecting portion 530 will be described with reference to FIGS. 11A to 11E.

FIG. 11B is a sectional view taken along a line b—b of FIG. 11A. As shown in FIGS. 11A and 11B, a pair of first, second and third fixed portions 521 to 523 are at least one pair of two or four flat surfaces formed by flattening outer peripheral surfaces of the rotating shaft 20. In order to provide the first and second permanent strain portions 524 and 525 on the rotating shaft 20, tools 551 to 553 are hung on the upper and lower first, second and third fixed portions 521 to 523 to twist the rotating shaft 20 by a predetermined angle, thereby applying a predetermined permanent strain.

For example, in FIG. 11A, twice-divided (half) tools 551 to 553 are first caused to abut on the upper and lower fixed portions 521 to 523 and are assembled thereto with bolts 554. The tool 551 is a disc-shaped member obtained by combining left and right tool halves 551A and 551B. The tool 552 is a disc-shaped member obtained by combining left and right tool halves 552A and 552B. The tool 553 is a disc-shaped member obtained by combining left and right tool halves 553A and 553B.

Next, in FIG. 11C, the upper and lower tools 551 and 553 are fixed and the central tool 552 is twisted or the upper and lower tools 551 and 553 and the central tool 552 are twisted in opposite directions to each other, thereby applying an excess torque for a predetermined time and plastically deforming the rotating shaft 20 to apply a permanent strain. At this time, a torque to be applied to the central tool 552 is approximately 60 to 80 Kgf·m, for example. A torque to be applied to the upper and lower tools 551 and 553 is approximately 30 to 40 Kgf·m, for example.

Then, the torque is eliminated and the tools 551 to 553 are removed from the fixed portions 521 to 523. Thus, a permanent strain can be applied between the first and second fixed portions 521 and 522 and between the second and third fixed portions 522 and 523 in the rotating shaft 20 as shown in FIG. 1D. A portion of the rotating shaft 20 to which the permanent strain is applied acts as the first permanent strain portion 524 and the second permanent strain portion 525.

In this state, there are twists in opposite directions to the axially longitudinal direction of the rotating shaft 20 by setting the second fixed portion 522 as a boundary. Therefore, a reference line SL is spiral in a vertically reverse direction.

Thereafter, the detecting portion 530 is assembled to the rotating shaft 20 provided with the first and second permanent strain portions 524 and 525 as shown in FIG. 1E. Thus, the torque detecting device 500 can be obtained.

Figure 12:
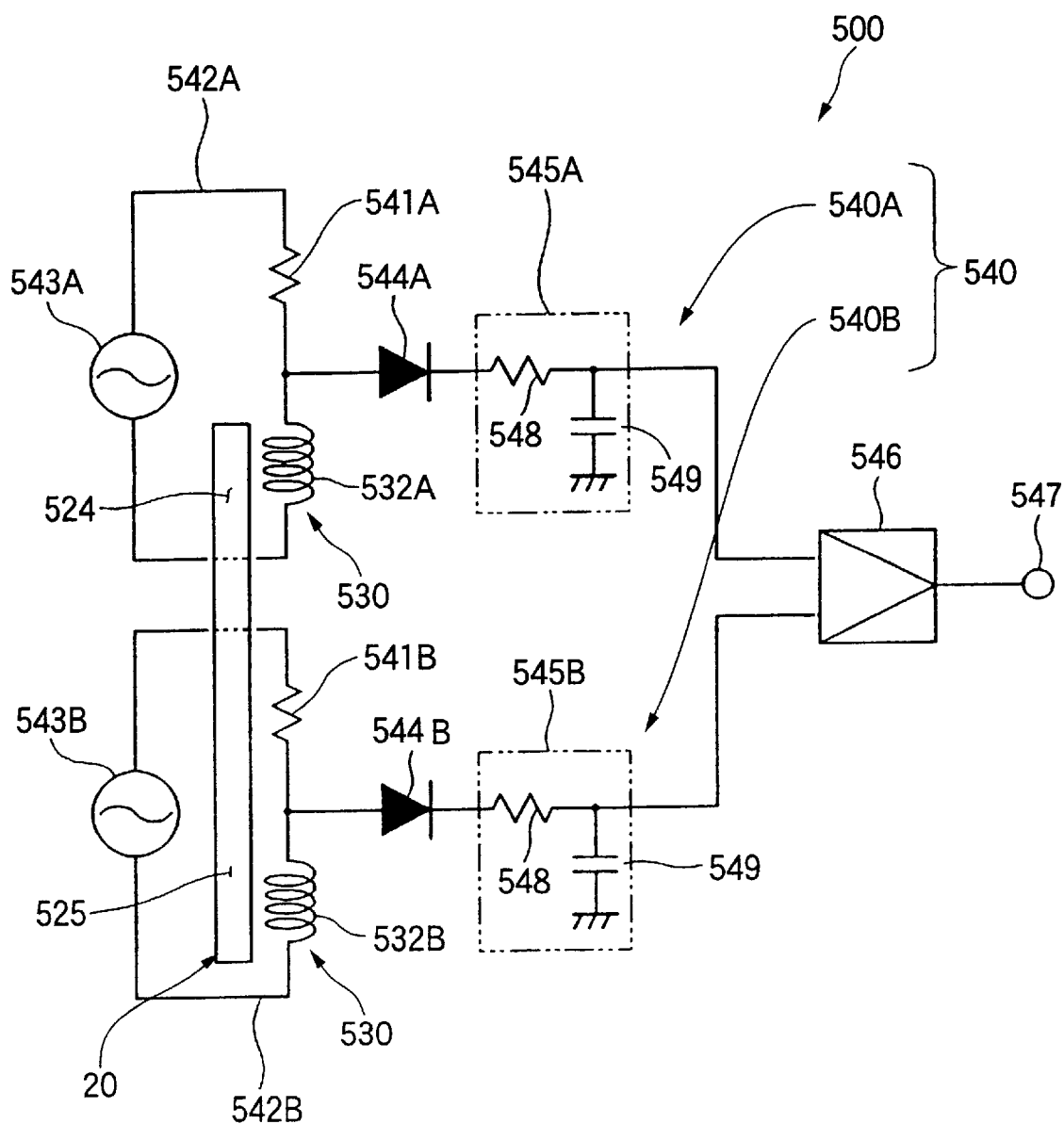
FIG. 12 is a circuit diagram showing the torque detecting device (the fifth embodiment) according to the invention.

FIG. 12 is a circuit diagram showing the torque detecting device according to the fifth embodiment of the invention. The output circuit portion 540 of the torque detecting device according to the fifth embodiment is obtained by a a combination of two sets of circuit portions (a first circuit portion 540A and a second circuit portion 540B) and an amplifier 546.

In the first circuit portion 540A, an AC voltage is applied from an alternating current voltage supply source 543A to a series circuit 542A in which the first coil 532A and a resistor 541A having a constant resistance value are connected in series. Then, the change of the impedance of the first coil 532A is converted into an AC voltage to be fetched as the first detection signal of the detecting portion 530. The fetched detection signal having the AC voltage is rectified by a diode 544A and is then converted into a detection signal having less noise and a DC voltage through a low-pass filter 545A. The converted detection signal having the DC voltage is output to an amplifier 546.

The second circuit portion 540B has the same circuit structure as that of the first circuit portion 540A. An AC voltage is applied from an alternating current voltage supply source 543B to a series circuit 542B in which the second coil 532B and a resistor 541B having a constant resistance value are connected in series, the change of the impedance of the second coil 532B is converted into an AC voltage to be fetched as the second detection signal of the detecting portion 530. The fetched detection signal having the AC voltage is rectified by a diode 544B and is then converted into a detection signal having less noise and a DC voltage through a low-pass filter 545B. The converted detection signal having the DC voltage is output to the amplifier 546.

The amplifier 546 serves to amplify (differentially amplify) a difference between the detection signals sent from the first circuit portion 540A and the second circuit portion 540B and to output a torque detection signal from an output terminal 547.

The diodes 544A and 544B are connected to the series circuits 542A and 542B to obtain a rectifying circuit. The low-pass filters 545A and 545B are smoothing circuits including a resistor 548 and a capacitor 549.

Figure 13A:
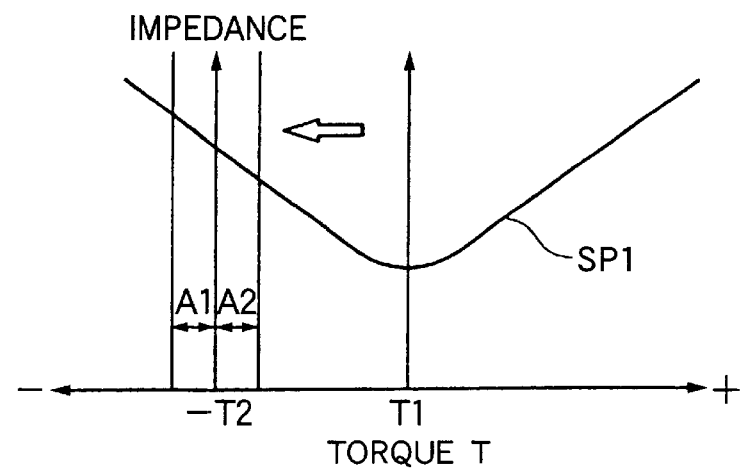
FIGS. 13A to 13C are magnetostrictive characteristic charts of the torque detecting device (the fifth embodiment) according to the invention.
Figure 13B:
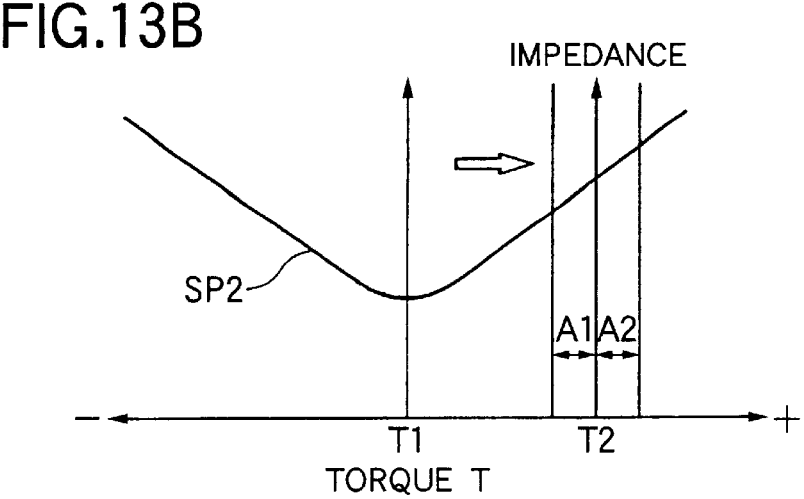
Figure 13C:
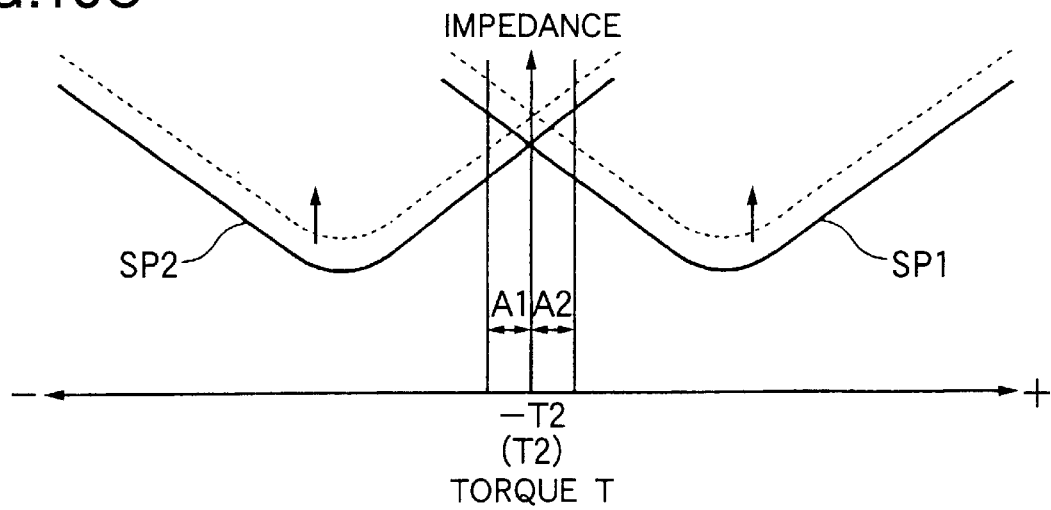

FIGS. 13A to C are magnetostrictive characteristic charts of the torque detecting device according to the fifth embodiment of the invention, in which an axis of abscissa indicates a change in a torque T applied to the rotating shaft and an axis of ordinate indicates a change in the impedance of the coil corresponding to FIG. 3.

FIG. 13A is a magnetostrictive characteristic chart showing a first magnetostrictive characteristic curve SP1, FIG. 13B is a magnetostrictive characteristic chart showing a second magnetostrictive characteristic curve SP2, and FIG. 13C is a magnetostrictive characteristic chart obtained by synthesizing FIGS. 13A and 13B.

The first magnetostrictive characteristic curve SP1 corresponds to the first coil 532A and is identical to the magnetostrictive characteristic curve SP shown in FIG. 3.

A torque origin T1 of the rotating shaft 20 to be employed for the torque detecting device is shifted to a torque origin −T2 (torque T≠0) by twisting the rotating shaft 20 to apply a permanent strain. As a result, the first magnetostrictive characteristic curve SP1 has left and right characteristics which are asymmetrical with a vertical line passing through the torque origin −T2. In other words, a torque application start point is moved.

Moreover, the second magnetostrictive characteristic curve SP2 corresponds to the second coil 532B and has a characteristic which is transversely symmetrical with that of the first magnetostrictive characteristic curve SP1 with respect to a vertical line passing through a torque origin T2, that is, a reverse characteristic as shown in FIG. 13C.

The torque origin T1 of the rotating shaft 20 to be employed for the torque detecting device is shifted to the torque origin T2 (torque T+0) as shown in 13B by twisting the rotating shaft 20 in a reverse direction to apply a permanent strain. As a result, the second magnetostrictive characteristic curve SP2 has left and right characteristics which are asymmetrical with a vertical line passing through the torque origin T2. In other words, a torque application start point is moved.

As shown in FIG. 13C, by using left and right constant ranges A1 and A2 in the first and second magnetostrictive Silo characteristic curves SP1 and SP2 which set the torque origins −T2 and T2 as references, accordingly, the direction and magnitude of the torque can be found from the absolute value of the impedance.

In addition, in the fifth embodiment, a change in a permeability which is generated in each of the first and second permanent strain portions 524 and 525 having reverse magnetostrictive characteristics to each other is detected by each of the first and second coils 532A and 532B, and detection signals are differentially amplified by the amplifier 546 and are thus output as torque detection signals.

Corresponding to a change in the temperature of an external environment, the first magnetostrictive characteristic curve SP1 and the second magnetostrictive characteristic curve SP2 are changed in the same manner. For example, in the case of a rise in the temperature, they are changed as shown in a broken line. Accordingly, when each of the detection signals corresponding to the first and second magnetostrictive characteristic curves SP1 and PS2 is differentially amplified by the amplifier 546 and an output is fetched, the value of a difference in a certain torque T is not changed even if the temperature is varied.

Therefore, it is possible to eliminate the influence of a temperature characteristic and to obtain a stable signal characteristic and a more excellent torque detection signal which is not changed even if an environmental temperature is varied.

In the fifth embodiment, furthermore, the first and second magnetostrictive characteristic curves SP1 and SP2 have characteristics which are transversely symmetrical with vertical lines passing through the torque origins −T2 and T2 to be detection references. Therefore, it is possible to carry out the failure diagnosis of the torque detecting device 500 by comparing the two magnetostrictive characteristics. For example, ½ of a value obtained by adding detection values corresponding to the first and second magnetostrictive characteristic curves SP1 and SP2 is constant. Therefore, when a value which is greatly different from the above-mentioned value is obtained, it can be decided that the torque detecting device 500 has a failure.

Returning to FIG. 12, description will be continuously given. By using the rotating shaft 20 to which the permanent strain is applied as described above, the magnetostrictive effect produced in the first permanent strain portion 524 is detected by the first coil 532A and the magnetostrictive effect produced in the second permanent strain portion 525 is detected by the second coil 532B. Consequently, it is possible to detect the direction and magnitude of the torque applied to the rotating shaft 20.

More specifically, the permeability of each of the first and second permanent strain portions 524 and 525 is changed according to the torque applied to the rotating shaft 20, and a change in an impedance in each of the first and second coils 532A and 532B which is generated at this time is detected by the output circuit portion 540. Consequently, it is possible to detect the direction and value of the torque.

Figure 14:
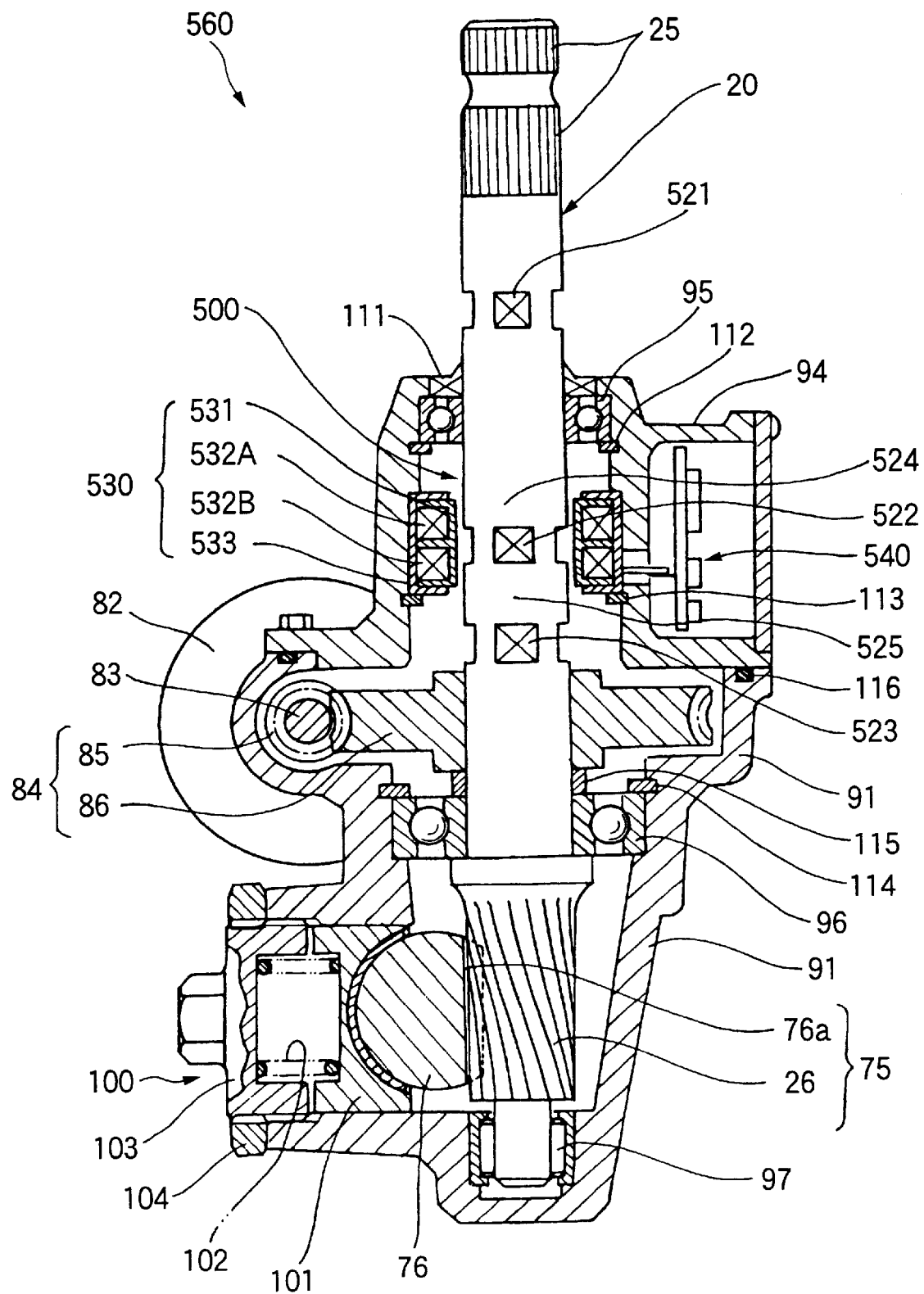
FIG. 14 is a longitudinal sectional view showing an electromotive power steering apparatus (the fifth embodiment) according to the invention.

FIG. 14 is a longitudinal sectional view showing an electromotive power steering apparatus-according to the fifth embodiment of the invention corresponding to FIG. 6.

An electromotive power steering apparatus 560 according to the fifth embodiment is characterized in that the torque detecting device 500 shown in FIGS. 11 to 13 is mounted thereon. Other structures are the same as those in FIGS. 4 to 6 and description will be omitted.

FIGS. 15A to 15F are views illustrating the structure of a torque detecting device according to a sixth embodiment of the invention and a procedure for manufacturing the torque detecting device.

A torque detecting device 600 according to the sixth embodiment shown in FIG. 15F is a magnetostriction type torque sensor. A first magnetostrictive film 601 and a second magnetostrictive film 602 are provided on the surface of a rotating shaft 20 with a predetermined width W over a whole periphery. A detecting portion 530 for electrically detecting magnetostrictive effects produced in the first and second magnetostrictive films 601 and 602 is provided around the first and second magnetostrictive films 601 and 602. An output circuit portion 540 processes the detection signal of the detecting portion 530 and outputs it as a torque detection signal.

The sixth embodiment is characterized in that a first fixed portion 521, a second fixed portion 522 and a third fixed portion 523 are sequentially provided on the rotating shaft 20 to have a predetermined distance in an axially longitudinal direction, the first magnetostrictive film 601 is provided between the first and second fixed portions 521 and 522 and the second magnetostrictive film 602 is provided between the second and third fixed-portions 522 and 523.

The first magnetostrictive film 601 changes a magnetostrictive characteristic corresponding to an applied torque and a strain is given thereto by twisting the first and second fixed portions 521 and 522.

The second magnetostrictive film 602 changes a magnetostrictive characteristic corresponding to an applied torque and a strain is given thereto by twisting the second and third fixed portions 522 and 523 in an opposite direction to the first and second fixed portions 521 and 522.

The first and second magnetostrictive films 601 and 602 are formed of a material having a great change in a magnetic flux density in accordance with a change in the strain, and comprise plated layers formed of the same material as that of the magnetostrictive film 201 according to the second embodiment shown in FIG. 7 and having predetermined thicknesses.

As described above, the rotating shaft 20 is provided with the first and second magnetostrictive films 601 and 602 to which a strain is applied. Therefore, when a torque is applied to the first and second magnetostrictive films 601 and 602 through the rotating shaft 20, the permeability of each of the first and second magnetostrictive films 601 and 602 is changed according to the torque and the change of an impedance in each of the first and second coils 532A and 532B shown in FIG. 12 which is generated at this time is detected by the output circuit portion 540, so that the direction and value of the torque can be detected.

Next, a procedure for providing the first and second magnetostrictive films 601 and 602 having a strain on the rotating shaft 20 constituted as described above to assemble the detecting portion 530 will be described with reference to FIGS. 15A to 15F. FIG. 15B is a sectional view taken along a line b—b of FIG. 15A.

Since the procedure shown in FIGS. 15A to 15C is the same as the procedure shown in FIGS. 11A to 11C, description will be omitted. A torque to be applied when twisting the rotating shaft 20 and a torque application time are smaller than those of the fifth embodiment and are such as not to cause a permanent strain to remain in the rotating shaft 20 itself. At this time, a torque to be applied to a central tool 552 is approximately 6 to 12 Kgf·m, for example. A torque to be applied to upper and lower tools 551 and 553 is approximately 3 to 6 Kgf·m, for example.

FIG. 15D shows a state in which the rotating shaft 20 is twisted. In this state, there are twists in opposite directions to the axially longitudinal direction of the rotating shaft 20 by setting the second fixed portion 522 as a boundary. Therefore, a reference line SL is spiral in a vertically reverse direction.

In the twist state, next, plating is carried out over the outer peripheral surface of the rotating shaft 20 and in predetermined positions between the first and second fixed portions 521 and 522 and between the second and third fixed portions 522 and 523, so that the first and second magnetostrictive films 601 and 602 comprising plated layers are formed.

In order to easily understand the "twist state" of the first and second magnetostrictive films 601 and 602, reference lines SL01 and SL02 extended in an axially longitudinal direction are described on the surfaces of the first and second magnetostrictive films 601 and 602. Since the first and second magnetostrictive films 601 and 602 are not twisted in FIG. 15D, the reference lines SL01 and SL02 are straight lines in the axially longitudinal direction.

Then, the torque is eliminated to restore the twist state of the rotating shaft 20 and the tools 551 to 553 are removed from the upper and lower fixed portions 521 to 523. Since the rotating shaft 20 is not twisted in this state, the reference line SL is returned to a straight line in an axially longitudinal direction as shown in FIG. 15E. Moreover, since the first and second magnetostrictive films 601 and 602 are twisted, the reference lines SL01 and SL02 become spiral.

By permanently deforming the first and second magnetostrictive films 601 and 602 as shown in FIG. 15E, thus, a strain can be permanently applied to the first and second magnetostrictive films 601 and 602 as a result. In other words, the strain permanently remains in the first and second magnetostrictive films 601 and 602 by only restoring the twisted rotating shaft 20.

Then, it is possible to obtain the torque detecting device 600 by assembling the detecting portion 530 to the rotating shaft 20 provided with the first and second magnetostrictive films 601 and 602 as shown in FIG. 15F.

In the procedure of FIGS. 15A to 15F, (1) the plating is carried out between the first and second fixed portions 521 and 522 and between the second and third fixed portions 522 and 523 in the rotating shaft 20 to form the first and second magnetostrictive films 601 and 602, (2) the tools 551 to 553 are then hung on the fixed portions 521 to 523 to twist the rotating shaft 20, and (3) the first and second magnetostrictive films 601 and 602 are plastically deformed to apply a predetermined permanent strain. As a result, the permanent strain may be applied to the first and second magnetostrictive films 601 and 602.

Next, description will be given to an example in which the torque detecting device 600 having the structure and function described above is mounted on an electromotive power steering apparatus.

Figure 16:
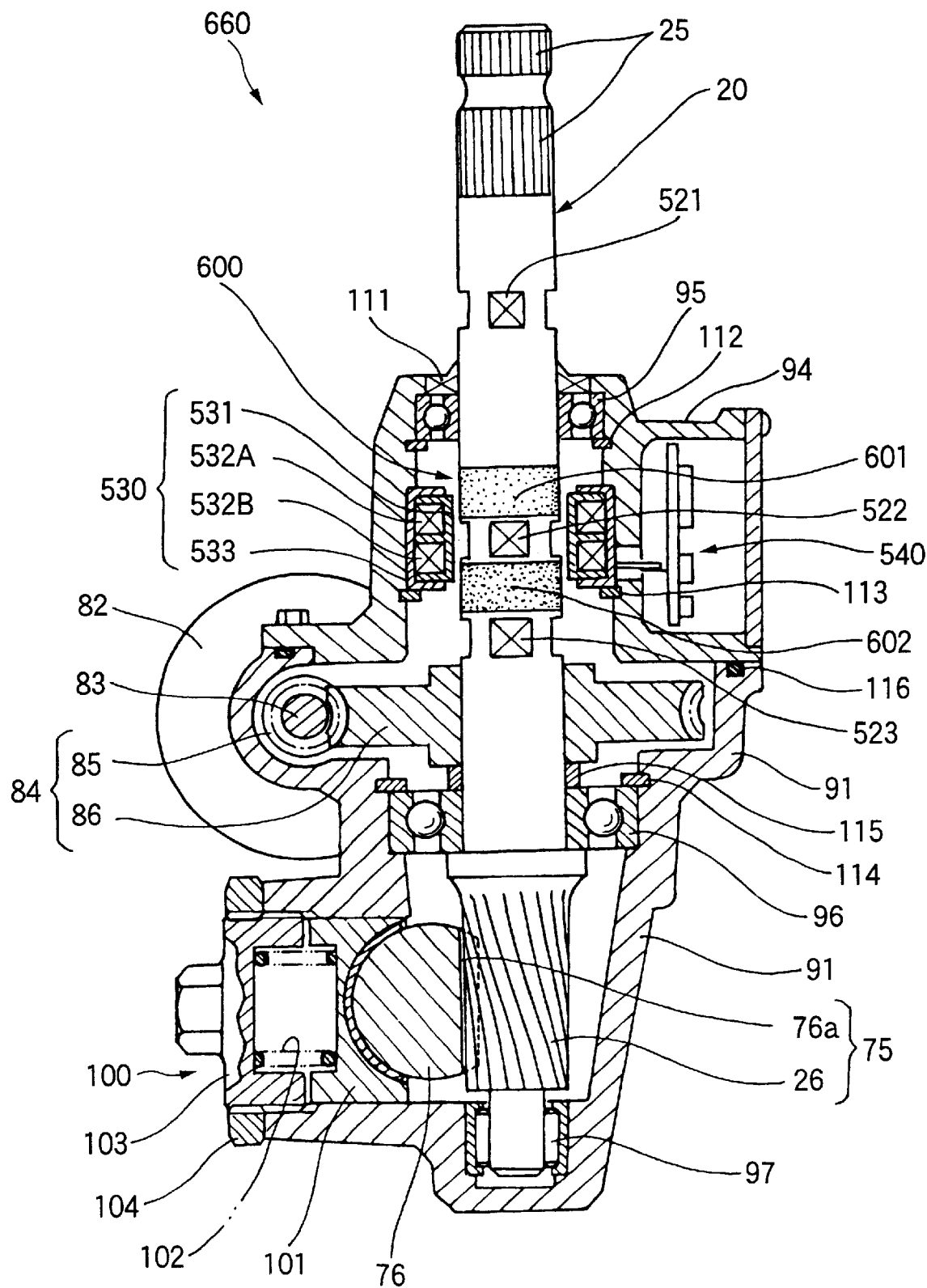
FIG. 16 is a longitudinal sectional view showing an electromotive power steering apparatus (the sixth embodiment) according to the invention.

FIG. 16 is a longitudinal sectional view showing an electromotive power steering apparatus according to the sixth embodiment of the invention corresponding to FIG. 6.

An electromotive power steering apparatus 660 according to the sixth embodiment is characterized by the use of the rotating shaft 20 provided with the first and second magnetostrictive films 601 and 602 to which a strain is applied. Other structures are the same as those in FIG. 14 and description will be omitted.

Figure 17:
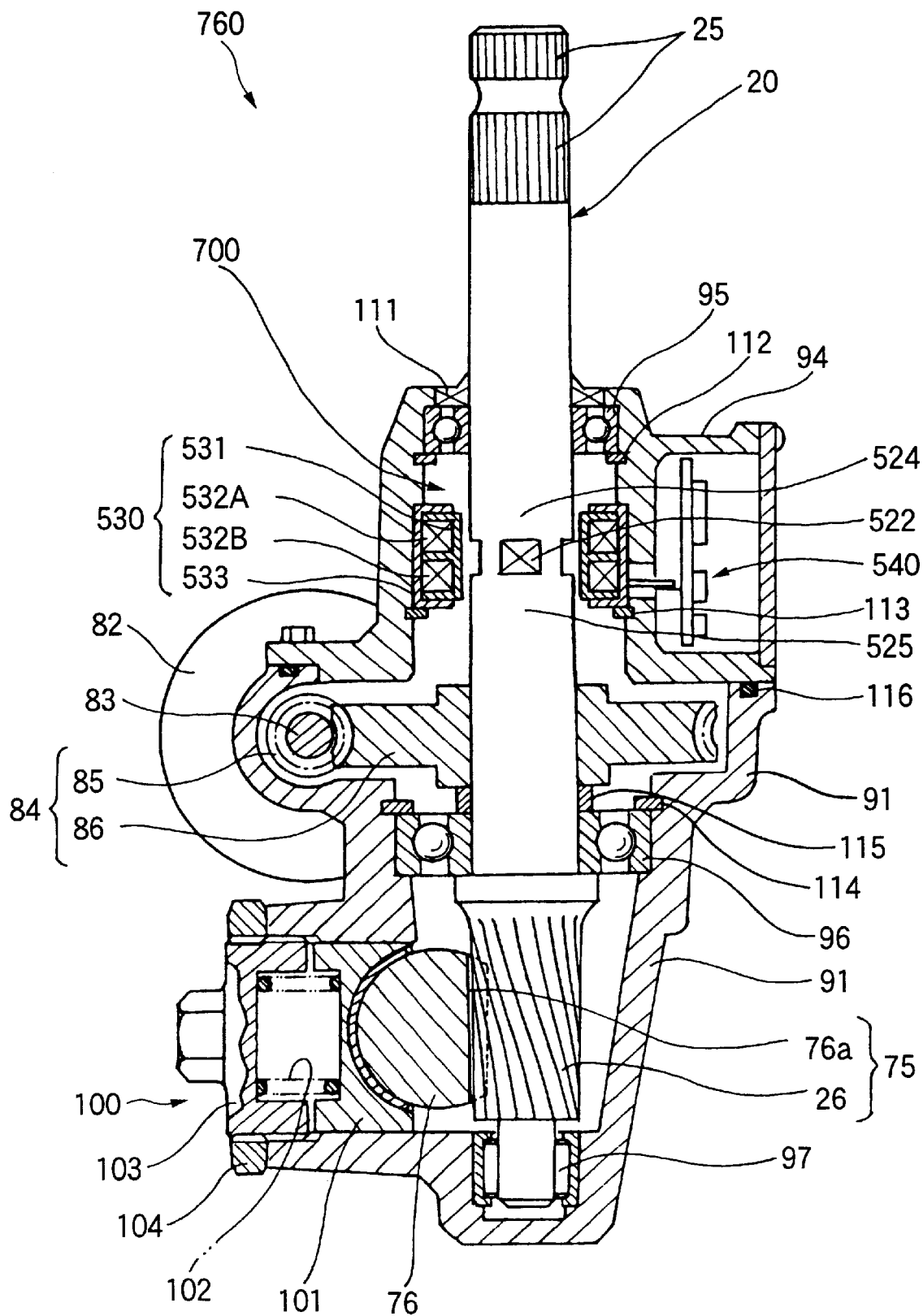
FIG. 17 is a longitudinal sectional view showing an electromotive power steering apparatus (a seventh embodiment) according to the invention.

FIG. 17 is a longitudinal sectional view showing an electromotive power steering apparatus according to a seventh embodiment of the invention corresponding to FIG. 14.

A torque detecting device 700 and an electromotive power steering apparatus 760 mounting the torque detecting device 700 thereon according to the seventh embodiment are characterized in that (1) the first fixed portion 521 and the third fixed portion 523 are not provided, (2) a spline coupling portion 25 or a serration coupling portion 25 of a rotating shaft 20 serves as the first fixed portion 521, and (3) a pinion 26 of the rotating shaft 20 serves as the third fixed portion 523 as compared with the torque detecting device 500 and the electromotive power steering apparatus 560 according to the fifth embodiment shown in FIGS. 11A to 14.

As described above, the rotating shaft 20 is substantially coupled integrally with a worm wheel 86 in an axially longitudinal center portion thereof. As a result, a rigidity is very great in the portion of the rotating shaft 20 to which the worm wheel 86 is coupled.

A tool is hung on the spline coupling portion 25 or the serration coupling portion 25 and a tool is hung on the pinion 26 and the second fixed portion 522. When these tools are rotated to twist the rotating shaft 20, the rotating shaft 20 is not plastically deformed uniformly and wholly in the axially longitudinal direction.

More specifically, the rotating shaft 20 is plastically deformed between the spline coupling portion 25 or the serration coupling portion 25 and the second fixed portion 522 and between the second fixed portion 522 and the worm wheel 86 coupling portion, that is, in a portion in which the sectional area in a radial direction is almost equal. Accordingly, first and second permanent strain portions 524 and 525 according to the seventh embodiment can also obtain the same magnetostrictive characteristics as those of the fifth embodiment shown in FIG. 14.

In addition, only one fixed portion is enough for hanging a tool or a jig on the rotating shaft 20 to be twisted. Accordingly, the rigidity of the rotating shaft 20 can be enhanced still more.

Figure 18:
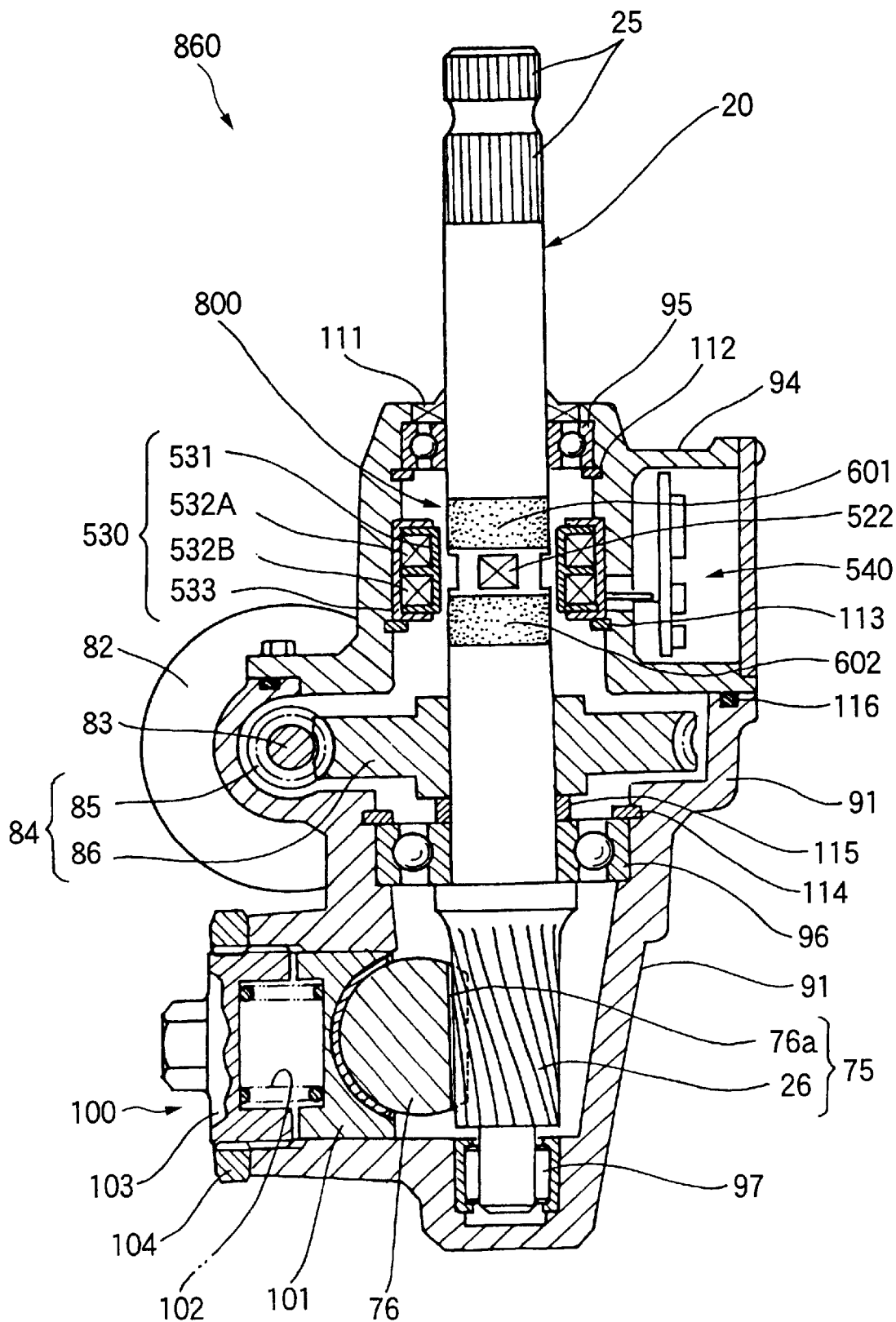
FIG. 18 is a longitudinal sectional view showing an electromotive power steering apparatus (an eighth embodiment) according to the invention.

FIG. 18 is a longitudinal sectional view showing an electromotive power steering apparatus according to an eighth embodiment of the invention corresponding to FIG. 16.

Figure 15:
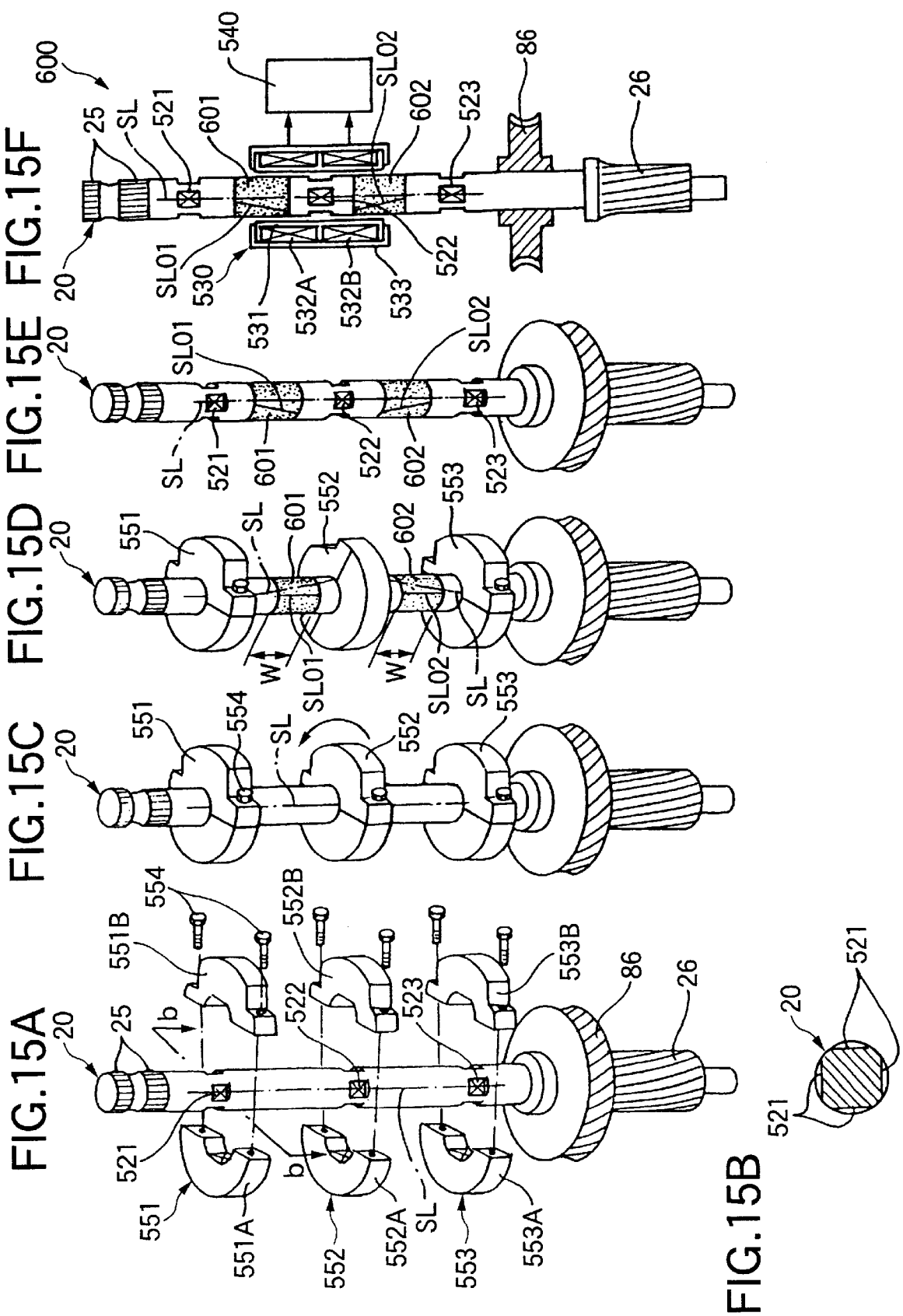
FIGS. 15A to 15F are views illustrating a structure of a torque detecting device (a sixth embodiment) according to the invention and a procedure for manufacturing the torque detecting device.

A torque detecting device 800 and an electromotive power steering apparatus 860 mounting the torque detecting device 800 thereon according to the eighth embodiment are characterized in that (1) the first fixed portion 521 and the third fixed portion 523 are not provided, (2) a spline coupling portion 25 or a serration coupling portion 25 of a rotating shaft 20 serves as the first fixed portion 521, and (3) a pinion 26 of the rotating shaft 20 also serves as the third fixed portion 523 as compared with the torque detecting device 600 and the electromotive power steering apparatus 660 according to the sixth embodiment shown in FIGS. 15A to 16.

Also in the eighth embodiment, in the same manner as in the seventh embodiment, only one fixed portion is enough for hanging a tool or a jig on the rotating shaft 20 to be twisted. Accordingly, the rigidity of the rotating shaft 20 can be enhanced still more.

Referring to the fifth embodiment shown in FIGS. 11A to 14 and the seventh embodiment shown in FIG. 17, (1) the direction of the permanent strain of the second permanent strain portion 525 may be caused to be coincident with the direction of the permanent strain of the first permanent strain portion 524 and (2) the amount of the strain of the second permanent strain portion 525 may be set to be different from the amount of the-strain of the first permanent strain portion 524.

Referring to the sixth embodiment shown in FIGS. 15A to 16 and the eighth embodiment-shown in FIG. 18, moreover, (1) the direction of the strain of the second magnetostrictive film 602 may be caused to be coincident with the direction of the strain of the first magnetostrictive film 601 and (2) the amount of the strain of the second magnetostrictive film 602 may be set to be different from the amount of the strain of the first magnetostrictive film 601.

By taking the fifth embodiment as an example in which two strains are thus set in the same direction, description will be given with reference to FIGS. 11A to 13.

In FIG. 11C, for example, the upper tool 551 is fixed and the central tool 552 and the lower tool 553 are twisted in the same direction, thereby applying an excess torque for a predetermined time and plastically deforming the rotating shaft 20 to give a permanent strain. In this case, the torque to be applied to the second and third fixed portions 522 and 523 is set to be different from the torque to be applied to the first and second fixed portions 521 and 522.

By then eliminating the torque, in the rotating shaft 20 shown in FIG. 11D, (1) the direction of the permanent strain of the second permanent strain portion 525 can be caused to be coincident with the direction of the permanent strain of the first permanent strain portion 524 and (2) the amount of the strain of the second permanent strain portion 525 can be set to be different from (for example, to be smaller than) the amount of the strain of the first permanent strain portion 524.

In the axially longitudinal direction of the rotating shaft 20, there are twists in the same direction in such a state. Therefore, a reference line SL becomes spiral in the vertical same direction.

In this case, preferably, the circuit diagram according to the fifth embodiment shown in FIG. 12 has such a structure that only the detection signal of the first circuit portion 540A or the detection signal of the second circuit portion 540B is input to the amplifier 546 and is amplified by the amplifier 546 and the signal thus amplified is output as a torque detection signal.

Figure 19A:
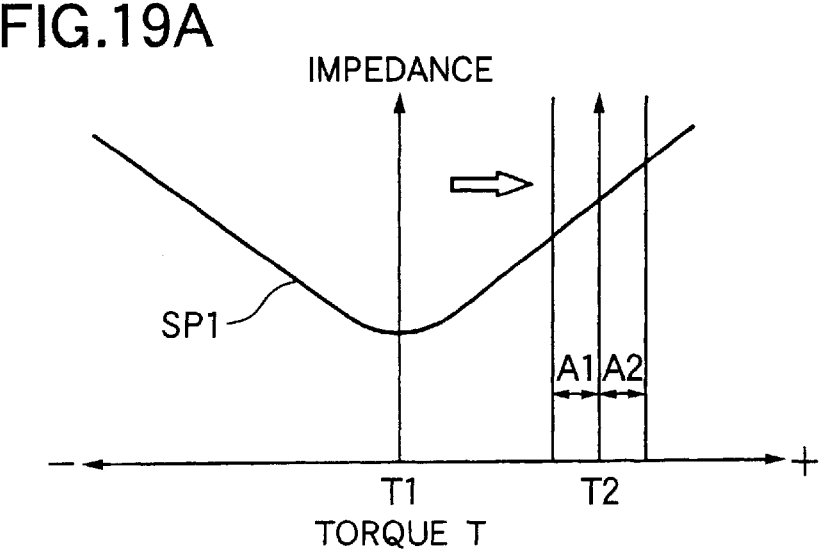
FIGS. 19A to 19C are magnetostrictive characteristic charts of a torque detecting device (a modification of the fifth embodiment) according to the invention.
Figure 19B:
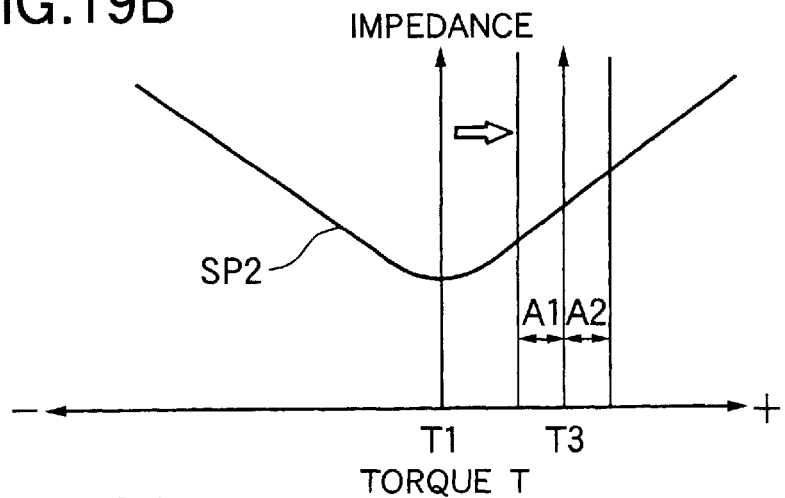
Figure 19C:
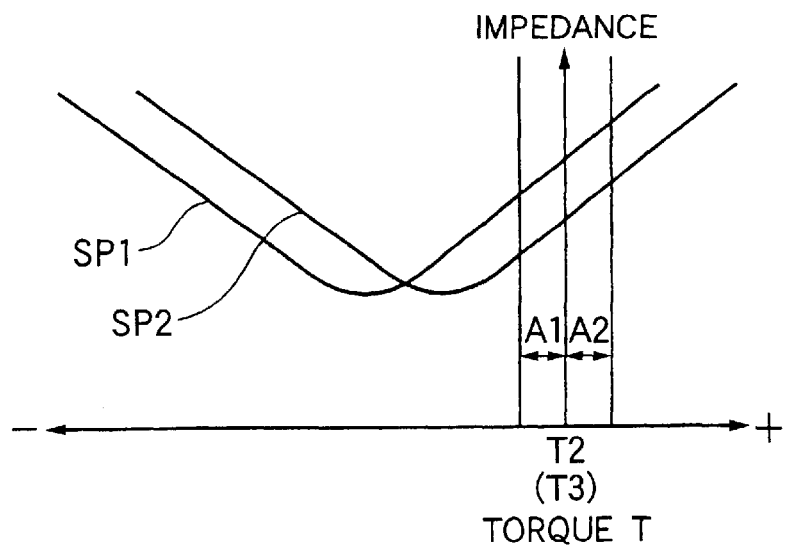
Figure 20:
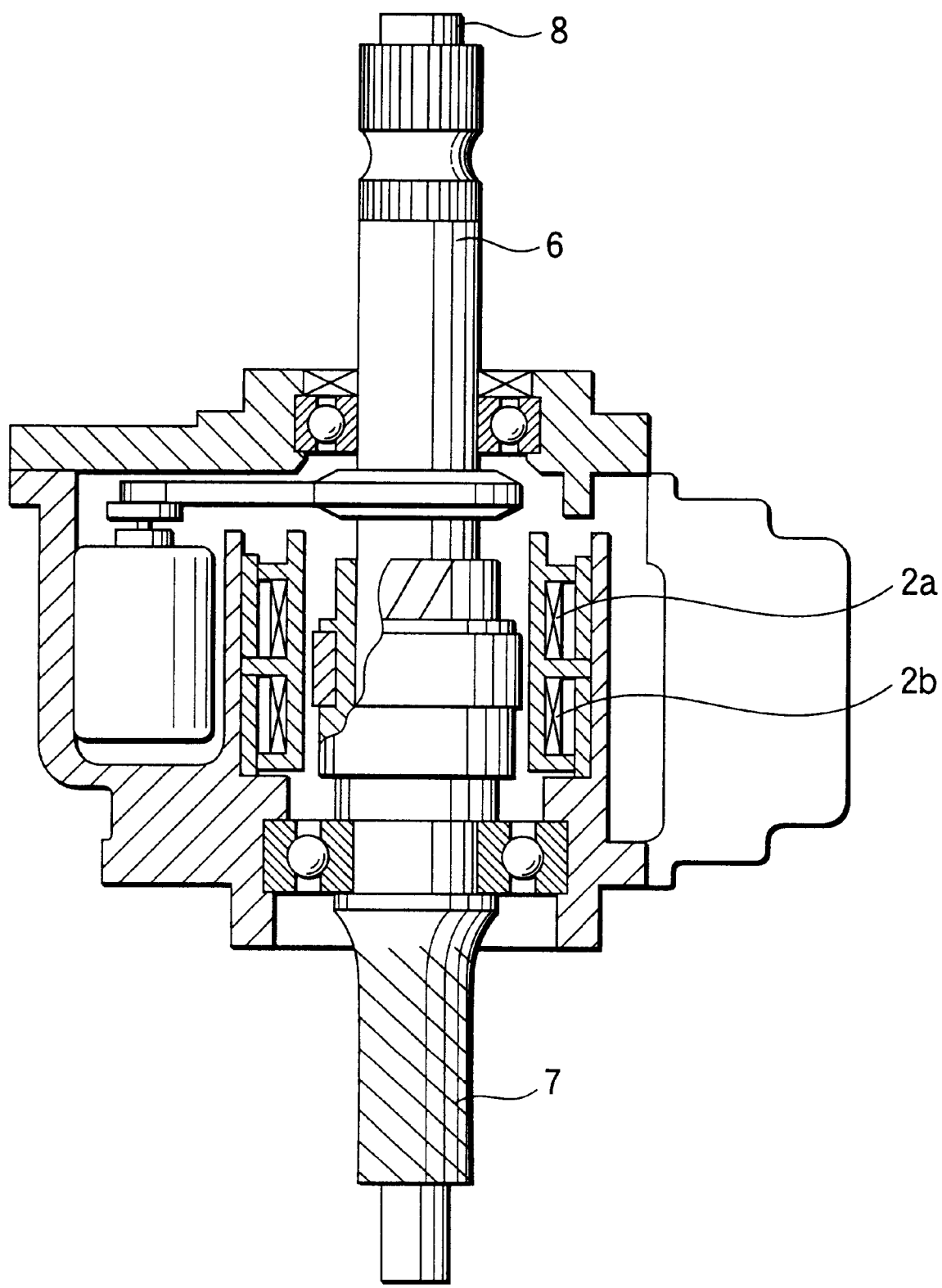
FIG. 20 is a view showing a torque detecting device of the related art.

The magnetostrictive characteristics of first and second coils 532A and 532B according to a modification of the fifth embodiment are shown in a magnetostrictive characteristic chart of FIGS. 19A to 19C in place of the magnetostrictive characteristic chart of FIG. 13.

FIGS. 19A to 19C are magnetostrictive characteristic charts of a torque detecting device according to the modification of the fifth embodiment of the invention, in which an axis of abscissa indicates a change in a torque T applied to a rotating shaft and an axis of ordinate indicates a change in the impedance of the coil corresponding to FIG. 13.

FIG. 19A is a magnetostrictive characteristic chart showing a first magnetostrictive characteristic curve SP1, FIG. 19B is a magnetostrictive characteristic chart showing a second magnetostrictive characteristic curve SP2, and FIG. 19C is a magnetostrictive characteristic chart obtained by synthesizing FIGS. 19A and 19B.

The first magnetostrictive characteristic curve SP1 corresponds to the first coil 532A and is identical to the first magnetostrictive characteristic curve SP1 shown in FIG. 13, and a torque origin T1 is shifted to a torque origin T2.

Moreover, the second magnetostrictive characteristic curve SP2 corresponds to the second coil 532B and has the same shape as that of the first magnetostrictive characteristic curve SP1, and the torque origin T1 is shifted to a torque origin T3 (torque T≠0). Since the amount of the strain of the second permanent strain portion 525 is set to be smaller than the amount of the strain of the first permanent strain portion 524, the torque origin T3 is positioned between the torque origin T1 and the torque origin T2.

As shown in FIG. 19C, in the first and second magnetostrictive characteristic curves SP1 and SP2, by using left and right constant ranges A1 and A2 which set the torque origins T2 and T3 as references, accordingly, the direction and magnitude of the torque can be found from the absolute value of the impedance.

In addition, in the modification described above, a change in a permeability which is generated in each of the first and second permanent strain portions 524 and 525 is detected by each of the first and second coils 532A and 532B, and one of detection signals is fed to an amplifier 546 and is amplified by the amplifier 546 and is thus output as a torque detection signal.

In the modification, it is possible to carry out the failure diagnosis of the torque detecting device 500 by comparing the detection values corresponding to the two magnetostrictive characteristics in the same manner as in the fifth embodiment. More specifically, in the modificaiton, a difference between the two detection values corresponding to the first and second magnetostrictive characteristic curves SP1 and SP2 is constant in the left and right constant ranges A1 and A2. Therefore, when the two detection values are compared with each other and a value which is greatly different from a normal difference is obtained, it is possible to decide that the torque detecting device 500 has a failure.

In the embodiment, the torque detecting device is not restricted to the provision in the electromotive power steering apparatus but can be applied to various apparatuses.

In the torque detecting device 600 according to the sixth embodiment shown in FIGS. 15A to 15F and the torque detecting device 800 according to the eighth embodiment shown in FIG. 18, moreover, changes (compositions) in the permeabilities of the first and second magnetostrictive films 601 and 602 may be mutually varied to obtain magnetostrictive characteristics having inclinations different from each other. For example, the plating is carried out with a predetermined torque applied to the rotating shaft 20, thereby forming the first and second magnetostrictive films 601 and 602 comprising plated layers having changes in permeabilities (compositions) different from each other.

As an example of the compositions different from each other, the first magnetostrictive film 601 is an Ni—Fe based alloy film containing 50% by weight of Ni and the second magnetostrictive film 602 is an Ni—Fe based alloy film containing 50% by weight of Ni.

The magnetostrictive characteristics having inclinations different from each other in the first and second magnetostrictive films 601 and 602 can be detected by the first and second coils 532A and 532B, these detection signals can be differentially amplified by the amplifier 546 in FIG. 12 and the signals thus amplified can be output as torque detection signals.

Also in this case, it is possible to eliminate the influence of a temperature characteristic, thereby obtaining a stable signal characteristic. Moreover, it is possible to carry out the failure diagnosis of the torque detecting devices 600 and 800 by comparing the two magnetostrictive characteristics.

The invention can produce the following effects by the structures described above.

According to the first aspect of the invention, the rotating shaft of the torque detecting device is an integral shaft which is not divided into the torque input side and the torque output side. Therefore, when the torque is applied, a very small torsional angle is enough for the rotating shaft. Accordingly, it is possible to eliminate the delay of a torque transmission time from the torque input side to the torque output side in the rotating shaft of the torque detecting device.

According to the first aspect of the invention, furthermore, a pair of fixed portions are provided on a rotating shaft to have a predetermined distance in an axially longitudinal direction, a permanent strain portion to which a permanent strain is applied by twisting the fixed portions and which changes a magnetostrictive characteristic corresponding to an applied torque is provided between the fixed portions, and a detecting portion for electrically detecting a magnetostrictive effect produced in the permanent strain portion is provided around the permanent strain portion. Therefore, even if the torsional angle of the rotating shaft is small, it is possible to reliably detect the torque by detecting, through the torque detecting portion, the magnetostrictive effect produced in the permanent strain portion corresponding to the torque.

According to the first aspect of the invention, furthermore, a pair of fixed portions are provided on the rotating shaft to have a predetermined distance in an axially longitudinal direction. Therefore, it is possible to provide the permanent strain portion to which an accurate permanent strain is applied between the fixed portions of the rotating shaft by hanging a tool or a jig on the fixed portion and twisting them. By applying the permanent strain to the rotating shaft, the origin of the magnetostrictive characteristic curve in the portion having the permanent strain portion can be shifted from the origin set before the application of the permanent strain. Accordingly, it is possible to reliably and quickly detect the direction and magnitude of the torque applied to the rotating shaft with a simple structure by detecting, through the detecting portion, the magnetostrictive effect produced in the permanent strain portion.

According to the second aspect of the invention, the rotating shaft of the torque detecting device is an integral shaft which is not divided into the torque input side and the torque output side. Therefore, when the torque is applied, a very small torsional angle is enough for the rotating shaft. Accordingly, it is possible to eliminate the delay of a torque transmission time from the torque input side to the torque output side in the rotating shaft of the torque detecting device.

According to the second aspect of the invention, furthermore, a pair of fixed portions are provided on a rotating shaft to have a predetermined distance in an axially longitudinal direction, a magnetostrictive film which is formed of a plated layer to change a magnetostrictive characteristic corresponding to an applied torque and to which a strain is applied by twisting the fixed portions is provided on a surface of the rotating shaft and between the fixed portions with a predetermined width over a whole periphery, and a detecting portion for electrically detecting a magnetostrictive effect produced in the magnetostrictive film is provided around the magnetostrictive film. Therefore, even if the torsional angle of the rotating shaft is very small, it is possible to reliably detect the torque by detecting, through the detecting portion, the magnetostrictive effect produced in the magnetostrictive film corresponding to the torque.

According to the second aspect of the invention, moreover, a pair of fixed portions are provided on the rotating shaft to, have a predetermined distance in an axially longitudinal direction. Therefore, it is possible to provide the magnetostrictive film to which an accurate strain is applied between the fixed portions of the rotating shaft by hanging a tool or a jig on the fixed portions and twisting them. By providing the magnetostrictive film having a strain applied thereto on the rotating shaft, the origin of the magnetostrictive characteristic curve of the magnetostrictive film is shifted from the origin set before the application of the strain. Accordingly, it is possible to reliably and quickly detect the direction and magnitude of the torque applied to the rotating shaft with a simple structure by detecting, through the detecting portion, the magnetostrictive effect produced in the magnetostrictive film.

According to the second aspect of the invention, furthermore, it is sufficient that the torque to twist the rotating shaft is so small as to apply a strain to the magnetostrictive film. The torque is such as to loosely twist the rotating shaft in an elastic region. Since it is not necessary to input an excess torque to the fixed portion, the torque can be managed more easily, and furthermore, precision in the torque can be increased. In addition, the torque is such as to loosely twist the rotating shaft in the elastic region. Therefore, equipment for inputting a torque to the fixed portion can have a simple and light structure.

Furthermore, since the input torque is small, the size of the fixed portion to be provided on the rotating shaft can be reduced. Correspondingly, it is possible to further increase the torsional rigidity of the rotating shaft by increasing the diameter of the rotating shaft.

According to the third aspect of the invention, the rotating shaft of the torque detecting device mounted on the electromotive power steering apparatus is an integral shaft which is not divided into the torque input side and the torque output side. Therefore, when a steering torque is applied, a very small torsional angle is enough. For this reason, a time delay is not caused on the operation of the wheel as compared with the steering of a steering wheel. Accordingly, it is possible to further increase the responsiveness of the electromotive power steering apparatus which generates an auxiliary torque corresponding to the steering torque and aids. Consequently, a steering sense can be enhanced still more.

In particular, also in the case in which the resisting feeling of the steering wheel is increased by decreasing the auxiliary torque corresponding to an increase in a vehicle speed, the torsional angle of the rotating shaft may be very small. Consequently, when steering the steering wheel, a steering angle thereof can be directly transmitted to the wheel so that comfortable steering having a high responsiveness can be carried out.

According to the third aspect of the invention, furthermore, the spline coupling portion or the serration coupling portion in the rotating shaft is also used for one of the fixed portions and the pinion of the rotating shaft is also used for the other fixed portion. Therefore, it is not necessary to provide the fixed portion to be twisted by hanging a tool or a jig thereon. Accordingly, the rigidity of the rotating shaft can be further increased.

According to the fourth aspect of the invention, the rotating shaft of the torque detecting device is an integral shaft which is not divided into the torque input side and the torque output side. Therefore, when the torque is applied, a very small torsional angle is enough for the rotating shaft. Accordingly, it is possible to eliminate the delay of a torque transmission time from the torque input side to the torque output side in the rotating shaft of the torque detecting device.

According to the fourth aspect of the invention, moreover, a first fixed portion, a second fixed portion and a third fixed portion are sequentially provided on a rotating shaft to have a predetermined distance in an axially longitudinal direction, a first permanent strain portion to which a permanent strain is applied by twisting the first and second fixed portions and which changes a magnetostrictive characteristic corresponding to an applied torque is provided between the first and second fixed portions, a second permanent strain portion to which a permanent strain different from that of the first permanent strain portion is applied by twisting the second and third fixed portions and which changes a magnetostrictive characteristic corresponding to an applied torque is provided between the second and third fixed portions, and a detecting portion for electrically detecting a magnetostrictive effect produced in the first and second permanent strain portions is provided around the first and second permanent strain portions. Therefore, even if the torsional angle of the rotating shaft is very small, it is possible to reliably detect the torque by detecting, through the detecting portion, the magnetostrictive effect produced in the first and second permanent strain portions corresponding to the torque.

According to the fourth aspect of the invention, furthermore, the first, second and third fixed portions are provided on the rotating shaft to have a predetermined distance in the axially longitudinal direction. Therefore, the first and second permanent strain portions to which accurate permanent strains different from each other are applied can be provided between the first, second and third fixed portions in the rotating shaft by twisting tools or jigs hung on the first, second and third fixed portions. By applying the permanent strain to the rotating shaft, the origins of the magnetostrictive characteristic curves in the portions having the first and second permanent strain portions can be shifted from the origin set before the application of the permanent strain. Accordingly, it is possible to reliably and quickly detect the direction and magnitude of the torque applied to the rotating shaft with a simple structure by detecting, through the detecting portion, the magnetostrictive effect produced in the first and second permanent strain portions.

In addition, it is possible to detect, through the detecting portion, the magnetostrictive effects of the magnetostrictive characteristics different from each other which are produced in the first and second permanent strain portions. Accordingly, it is possible to carry out the failure diagnosis of the torque detecting device by comparing two different detection values. Moreover, if a difference between the two different detection values is varied within a torque measurement range, it is possible to eliminate the influence of a temperature characteristic and to obtain a stable signal characteristic by taking a difference between the detection signals. Thus, it is possible to obtain amore excellent torque detection signal which is not varied according to a change in an environmental temperature.

According to the fifth aspect of the invention, the rotating shaft of the torque detecting device is an integral shaft which is not divided into the torque input side and the torque output side. Therefore, when the torque is applied, a very small torsional angle is enough for the rotating shaft. Accordingly, it is possible to eliminate the delay of a torque transmission time from the torque input side to the torque output side in the rotating shaft of the torque detecting device.

According to the fifth aspect of the invention, furthermore, a first fixed portion, a second fixed portion and a third fixed portion are sequentially provided on a rotating shaft to have a predetermined distance in an axially longitudinal direction, a first magnetostrictive film which is formed of a plated layer to change a magnetostrictive characteristic corresponding to an applied torque and to which a strain is applied by twisting the first and second fixed portions is provided on a surface of the rotating shaft and between the first and second fixed portions with a predetermined width over a whole periphery, a second magnetostrictive film which is formed of a plated layer to change a magnetostrictive characteristic corresponding to an applied torque and to which a strain is applied by twisting the second and third fixed portions in an opposite direction to the first and second fixed portions is provided on the surface of the rotating shaft and between the second and third fixed portions with a predetermined width over a whole periphery, and a detecting portion for electrically detecting a magnetostrictive effect produced in the first and second magnetostrictive films is provided around the first and second magnetostrictive films. Therefore, even if the torsional angle of the rotating shaft is very small, it is possible to reliably detect the torque by detecting, through the detecting portion, the magnetostrictive effects produced in the first and second magnetostrictive films corresponding to the torque.

According to the fifth aspect of the invention, moreover, the first, second and third fixed portions are provided on the rotating shaft to have a predetermined distance in an axially longitudinal direction. Therefore, the first and second magnetostrictive films to which accurate strains different from each other are applied can be provided between the first, second and third fixed portions in the rotating shaft by twisting tools or jigs hung on the first, second and third fixed portions. By applying the strain to the first and second magnetostrictive films, it is possible to shift the origins of the magnetostrictive characteristic curves in the portions having the first and second magnetostrictive films from the origin set before the application of the strain. Accordingly, it is possible to reliably and quickly detect the direction and magnitude of the torque applied to the rotating shaft with a simple structure by detecting, through the detecting portion, the magnetostrictive effects produced in the first and second magnetostrictive films.

In addition, it is possible to detect, through the detecting portion, the magnetostrictive effects of the magnetostrictive characteristics different from each other which are produced in the first and second magnetostrictive films. Accordingly, it is possible to carry out the failure diagnosis of the torque detecting device by comparing two different detection values. Moreover, if a difference between the two different detection values is varied within a torque measurement range, it is possible to eliminate the influence of a temperature characteristic and to obtain a stable signal characteristic by taking a difference between the detection signals. Thus, it is possible to obtain a more excellent torque detection signal which is not varied according to a change in an environmental temperature.

According to the fifth aspect of the invention, furthermore, it is sufficient that the torque to twist the rotating shaft is so small as to apply a strain to the first and second magnetostrictive films. The torque is such as to loosely twist the rotating shaft in an elastic region. Since it is not necessary to input an excess torque to the first, second and third fixed portions, the torque can be managed more easily, and furthermore, precision in the torque can be increased. In addition, the torque is such as to loosely twist the rotating shaft in the elastic region. Therefore, equipment for inputting a torque to the first, second and third fixed portions can have a simple and light structure.

Furthermore, since the input torque is small, the sizes of the first, second and third fixed portions to be provided on the rotating shaft can be reduced. Correspondingly, it is possible to further increase the torsional rigidity of the rotating shaft by increasing the diameter of the rotating shaft.

According to the sixth aspect of the invention, the rotating shaft of the torque detecting device mounted on the electromotive power steering apparatus is an integral shaft which is not divided into the torque input side and the torque output side. Therefore, when a steering torque is applied, a very small torsional angle is enough. For this reason, a time delay is not caused on the operation of the wheel as compared with the steering of a steering wheel. Accordingly, it is possible to further increase the responsiveness of the electromotive power steering apparatus which generates an auxiliary torque corresponding to the steering torque and aids. Consequently, a steering sense can be enhanced still more.

In particular, also in the case in which the resisting feeling of the steering wheel is increased by decreasing the auxiliary torque corresponding to an increase in a vehicle speed, the torsional angle of the rotating shaft may be very small. Consequently, when steering the steering wheel, a steering angle thereof can be directly transmitted to the wheel so that comfortable steering having a high responsiveness can be carried out.

According to the sixth aspect of the invention, furthermore, the spline coupling portion or the serration coupling portion in the rotating shaft is also used for the first fixed portion and the pinion of the rotating shaft is also used for the third fixed portion. Therefore, the second fixed portion is enough for the fixed portion to be twisted by hanging a tool or a jig thereon. Accordingly, the rigidity of the rotating shaft can be further increased.

Although there have been described what are the present embodiments of the invention, it will be understood by persons skilled in the art that variations and modifications may be made thereto without departing from the gist, spirit or essence of the invention.

What is claimed is:

1. A torque detecting device comprising:
   a rotating shaft including: a first fixed portion and a second fixed portion provided therein to have a predetermined distance in an axially longitudinal direction thereof; and a first permanent strain portion to which a permanent strain is applied by twisting the first and second fixed portions, and which changes a magnetostrictive characteristic corresponding to an applied torque, the first permanent strain portion being disposed between the first and second fixed portions; and
   a detecting portion disposed around the first permanent strain portion, for electrically detecting a magnetostrictive effect produced in the first permanent strain portion.

2. A torque detecting device according to claim 1, wherein:
   the rotating shaft further includes: a third fixed portion provided adjacent to the second fixed portion to have a predetermined distance in an axially longitudinal direction thereof; and a second permanent strain portion to which a permanent strain different from that of the first permanent strain portion is applied by twisting the second and third fixed portions and which changes a magnetostrictive characteristic corresponding to an applied torque, the second permanent strain portion being disposed between the second and third fixed portions, and
   the detecting portion is disposed around the first and second permanent strain portions for electrically detecting a magnetostrictive effect produced in the first and second permanent strain portions.

3. An electromotive power steering apparatus mounting the torque detecting device according to claim 1 as a steering torque sensor for detecting a steering torque of a steering system which is generated on a steering wheel for a vehicle,
   wherein the rotating shaft is a pinion shaft to be rotated through a universal joint by means of the steering wheel.

4. An electromotive power steering apparatus according to claim 3, wherein the first fixed portion is a spline coupling portion or a serration coupling portion which is formed on one of ends of the pinion shaft which is to be coupled to the universal joint, and the second fixed portion is a pinion of a rack and pinion mechanism to be coupled to a wheel.

5. An electromotive power steering apparatus according to claim 3, wherein:
   the rotating shaft of the torque detecting device further includes: a third fixed portion provided adjacent to the second fixed portion to have a predetermined distance in an axially longitudinal direction thereof; and a second permanent strain portion to which a permanent strain different from that of the first permanent strain portion is applied by twisting the second and third fixed portions and which changes a magnetostrictive characteristic corresponding to an applied torque, the second permanent strain portion being disposed between the second and third fixed portions,
   the detecting portion is disposed around the first and second permanent strain portions for electrically detecting a magnetostrictive effect produced in the first and second permanent strain portions, and
   the first fixed portion is a spline coupling portion or a serration coupling portion which is formed on one of ends of the pinion shaft which is to be coupled to the universal joint, and the third fixed portion is a pinion of a rack and pinion mechanism to be coupled to a wheel.

6. A torque detecting device comprising:
   a rotating shaft including a first fixed portion and a second fixed portion provided therein to have a predetermined distance in an axially longitudinal direction thereof;
   a first magnetostrictive film which is formed of a plated layer to change a magnetostrictive characteristic corresponding to an applied torque and to which a strain is applied by twisting the first and second fixed portions, the first magnetostrictive film being disposed on a surface of the rotating shaft and between the first and second fixed portions with a predetermined width over a whole periphery thereof; and
   a detecting portion disposed around the first magnetostrictive film for electrically detecting a magnetostrictive effect produced on the first magnetostrictive film.

7. A torque detecting device according to claim 6, wherein:
   the rotating shaft further includes: a third fixed portion provided adjacent to the second fixed portion to have a predetermined distance in an axially longitudinal direction thereof; and
   a second magnetostrictive film which is formed of a plated layer to change a magnetostrictive characteristic corresponding to an applied torque and to which a different strain from that of the first magnetostrictive film is applied by twisting the second and third fixed portions, the second magnetostrictive film being disposed on the surface of the rotating shaft and between the second and third fixed portions with a predetermined width over a whole periphery thereof, and
   the detecting portion is disposed around the first and second magnetostrictive films for electrically detecting a magnetostrictive effect produced in the first and second magnetostrictive films.

8. An electromotive power steering apparatus mounting the torque detecting device according to claim 6 as a steering torque sensor for detecting a steering torque of a steering system which is generated on a steering wheel for a vehicle, wherein the rotating shaft is a pinion shaft to be rotated through a universal joint by means of the steering wheel.

9. An electromotive power steering apparatus according to claim 8, wherein the first fixed portion is a spline coupling portion or a serration coupling portion which is formed on one of ends of the pinion shaft which is to be coupled to the universal joint, and the second fixed portion is a pinion of a rack and pinion mechanism to be coupled to a wheel.

10. An electromotive power steering apparatus according to claim 8, wherein:

the rotating shaft of the torque detecting device further includes: a third fixed portion provided adjacent to the second fixed portion to have a predetermined distance in an axially longitudinal direction thereof; and a second magnetostrictive film which is formed of a plated layer to change a magnetostrictive characteristic corresponding to an applied torque and to which a different strain from that of the first magnetostrictive film is applied by twisting the second and third fixed portions, the second magnetostrictive film being disposed on the surface of the rotating shaft and between the second and third fixed portions with a predetermined width over a whole periphery thereof, the detecting portion is disposed around the first and second magnetostrictive films for electrically detecting a magnetostrictive effect produced in the first and second magnetostrictive films, and the first fixed portion is a spline coupling portion or a serration coupling portion which is formed on one of ends of the pinion shaft which is to be coupled to the universal joint, and the second fixed portion is a pinion of a rack and pinion mechanism to be coupled to a wheel.

* * * * *

UNITED STATES PATENT AND TRADEMARK OFFICE
CERTIFICATE OF CORRECTION

PATENT NO. : 6,595,074 B2
DATED : July 22, 2003
INVENTOR(S) : Yasuo Shimizu and Shunichiro Sueyoshi It is certified that error appears in the above-identified patent and that said Letters Patent is hereby corrected as shown below:

Column 7,
Line 50, change "a-permanent strain portion 23 to which a permanent strain is" to
-- a permanent strain portion 23 to which a permanent strain is --.

Column 9,
Line 34, change "origin T2 (torque T ≈0) by twisting the rotating shaft 20 to" to
-- origin T2 (torque T ≠0) by twisting the rotating shaft 20 to --.

Column 11,
Line 56, change "78% by weight, Fe; remainder) or supermalloy (Ni; 78% by" to
-- 78% by weight, Fe; remainder) or Supermalloy (Ni; 78% by --.
Line 57, change "weight, Mo; 5% by weight, Fe; remainder) Ni represents" to
-- weight, Mo; 5% by weight, Fe; remainder). Ni represents --.

Column 12,
Line 64, change "may be-applied to the magnetostrictive film 201 in such a" to
-- may be applied to the magnetostrictive film 201 in such a --.

Column 15,
Line 39, change "in FIG. 1D. A portion of the rotating shaft 20 to which the" to
-- in FIG. 11D. A portion of the rotating shaft 20 to which the --.
Line 50, change "nent strain portions 524 and 525 as shown in FIG. 1E. Thus," to
-- nent strain portions 524 and 525 as shown in FIG. 11E. Thus, --.
Line 54, indent the start of the line because it is the start of a new paragraph.
Line 55, change "according to the fifth embodiment is obtained by a a com-" to
-- according to the fifth embodiment is obtained by a com- --.

Column 16,
Line 59, change "torque origin T2 (torque T+0) as shown in 13B by twisting" to
-- torque origin T2 (torque T≠0) as shown in 13B by twisting --.

Column 17,
Line 1, change "Silo characteristic curves SP1 and SP2 which set the torque" to
-- characteristics curves SP1 and SP2 which set the torque --.
Line 59, change "electromotive power steering apparatus-according to the" to
-- electromotive power steering apparatus according to the --.

UNITED STATES PATENT AND TRADEMARK OFFICE
CERTIFICATE OF CORRECTION

PATENT NO. : 6,595,074 B2
DATED : July 22, 2003
INVENTOR(S) : Yasuo Shimizu and Shunichiro Sueyoshi It is certified that error appears in the above-identified patent and that said Letters Patent is hereby corrected as shown below:

Column 18,
Line 21, change "between the second and third fixed-portions 522 and 523." to
-- between the second and third fixed portions 522 and 523. --.

Column 20,
Line 64, change "the amount of the-strain of the first permanent strain portion" to
-- the amount of the strain of the first permanent strain portion --.
Line 67, change "16 and the eighth embodiment-shown in FIG. 18, moreover," to
-- 16 and the eighth embodiment shown in FIG. 18, moreover, --.

Column 23,
Line 60, change "rotating shaft to, have a predetermined distance in an axially" to
-- rotating shaft to have a predetermined distance in an axially --.

Column 25,
Line 46, change "signals. Thus, it is possible to obtain amore excellent torque" to
-- signals. Thus, it is possible to obtain a more excellent torque --.

Signed and Sealed this

Seventeenth Day of February, 2004

JON W. DUDAS
*Acting Director of the United States Patent and Trademark Office*